US007784984B2

(12) United States Patent
Ishida

(10) Patent No.: US 7,784,984 B2
(45) Date of Patent: Aug. 31, 2010

(54) VEHICLE LAMP

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/625,437

(22) Filed: Jan. 22, 2007

(65) Prior Publication Data

US 2007/0171650 A1 Jul. 26, 2007

(30) Foreign Application Priority Data

Jan. 20, 2006 (JP) ............................. 2006-012705
Dec. 7, 2006 (JP) ............................. 2006-331191

(51) Int. Cl.
*B60Q 1/00* (2006.01)
*F21V 11/00* (2006.01)
*F21V 21/00* (2006.01)

(52) U.S. Cl. ....................... 362/538; 362/507; 362/539; 362/545

(58) Field of Classification Search ................. 362/506, 362/507, 538, 539, 543, 544, 545, 240
See application file for complete search history.

(56) References Cited

U.S. PATENT DOCUMENTS 4,851,968 A * 7/1989 Nino .......................... 362/539
2004/0160783 A1* 8/2004 Tatsukawa et al. .......... 362/507
2004/0213014 A1 10/2004 Koike
2005/0068787 A1* 3/2005 Ishida ........................ 362/538
2005/0094411 A1* 5/2005 Ishida et al. ................ 362/538
2005/0219856 A1* 10/2005 Tatsukawa .................. 362/507
2006/0215415 A1* 9/2006 Suzuki et al. ............... 362/539

FOREIGN PATENT DOCUMENTS

DE 10 2005 002 774 A1 8/2005
JP 2005-44683 A 2/2005

OTHER PUBLICATIONS

German Office Action dated Jan. 15, 2009.

* cited by examiner

*Primary Examiner*—Jong-Suk (James) Lee
*Assistant Examiner*—David R Crowe
(74) *Attorney, Agent, or Firm*—Sughrue Mion, PLLC

(57) ABSTRACT

A lamp unit as a vehicle lamp is structured by a compact constitution including a lens arranged on an optical axis extending in a front and rear direction of the lamp, and a light emitting element arranged rearward from the lens. The light emitting element is arranged at a vicinity of the rear side focal point in a state of inclining a light emitting chip in a skewed upper direction relative to a direction of a front face of the lamp. A vicinity of the light emitting element is arranged with a reflector for reflecting light from the light emitting chip to the lens. Light directed in a direction proximate to the optical axis emitted from the light emitting chip is incident on the lens, and also most of other light is made to be incident on the lens by being reflected by the reflector.

8 Claims, 17 Drawing Sheets

VEHICLE LAMP

This application claims foreign priority from Japanese Patent Application Nos. 2006-012705 filed on Jan. 20, 2006, and 2006-331191 filed on Dec. 7, 2006, the entire contents of which are hereby incorporated by reference.

BACKGROUND OF THE INVENTION

1. Field of the Invention

The present invention relates to a vehicle lamp constituting a light source by a light emitting element.

2. Related Art

In recent years, a light emitting element of a light emitting diode or the like has been frequently used.

For example, JP-A-2005-044683 describes a vehicle lamp including a lens arranged on an optical axis extending in a front and rear direction of a lamp, and a light emitting element arranged on a rear side of the lens, and constituted such that directly emitted light from the light emitting element is controlled to deflect by the lens to be illuminated to a front side of the lamp. Further, compact formation of the lamp can be achieved by adopting such a vehicle lamp.

The light emitting element of the vehicle lamp described in JP-A-2005-044683 is arranged to direct a light emitting chip thereof in a direction of a front face of the lamp and therefore, some portion of light emitted from the light emitting chip constitutes light emitted in a direction of an angle exceeding an opening angle of the lens and such light is generated over an entire periphery with regard to the optical axis.

However, such light is not controlled to deflect by the lens and therefore, the light cannot be effectively utilized as front illuminating light and therefore, there poses a problem that an efficiency of utilizing a light flux of a light source is reduced by that amount.

SUMMARY OF THE INVENTION

One or more embodiments of the invention provide a vehicle lamp constituting a light source by a light emitting element capable of increasing an efficiency of utilizing a light flux of a light source even though compact formation of the lamp is achieved.

In accordance with one or more embodiments of the invention, an efficiency of utilizing a light flux is increased by an arrangement of a light emitting element and a predetermined reflector.

In accordance with one or more embodiments of the invention, a vehicle lamp is provided with a lens arranged on an optical axis extending in a front and rear direction of the lamp and a light emitting element arranged rearward from the lens. In the vehicle lamp, a sectional shape of the lens along a vertical face including the optical axis may be set to a shape of a convex lens having a rear side focal point on the optical axis. In the vehicle lamp, the light emitting element is arranged at a vicinity of the rear side focal point in a state of directing a light emitting chip of the light emitting element in a skewed front direction inclined in an upper direction or a lower direction by a predetermined angle relative to a direction of a front face of the lamp. In the vehicle lamp, a vicinity of the light emitting element is arranged with a reflector for reflecting light from the light emitting chip to the lens.

A kind of the "vehicle lamp" is not particularly limited but, for example, a lamp unit or the like of a headlamp, a fog lamp, a cornering lamp, a daytime running lamp or the like, or constituting a portion thereof may be adopted.

The "optical axis" may coincide with an axis line extended in a front and rear direction of the vehicle or may not coincide therewith so far as the optical axis is an axis line extended in a front and rear direction of the lamp.

The "lens" is not particularly limited in a specific shape. The lens may have a sectional shape along the vertical face including the optical axis is set to the shape of the convex lens having the rear side focal point on the optical axis.

The "light emitting element" signifies a light source in a shape of an element having the light emitting chip emitted by face emittance substantially in a point-like shape, a kind thereof is not particularly limited, but, for example, a light emitting diode, a laser diode or the like may be adopted.

Although a specific value of the "predetermined angle" is not particularly limited, it is preferable to set the value to a value of about 40 through 80° and it is further preferable to set the value to a value of about 50 through 70°.

The "reflector" is not particularly limited in a specific shape of a reflecting face thereof so far as the reflector is arranged at the vicinity of the light emitting element and constituted to reflect the light from the light emitting chip to the lens.

As shown by the above-described constitution, the vehicle lamp according to one or more embodiments of the invention is structured by the constitution of including the lens arranged on the optical axis extended in the front and rear direction of the lamp and the light emitting element arranged rearward therefrom, the sectional shape of the lens along the vertical face including the optical axis is set to a shape of the convex lens having the rear side focal point on the optical axis, further, the light emitting element is arranged at the vicinity of the rear side focal point of the lens in the state of directing the light emitting chip in the skewed front direction inclined in the upper direction or the lower direction by the predetermined angle relative to the direction of the front face of the lamp, further, the vicinity of the light emitting element is arranged with the reflector for reflecting the light from the light emitting chip to the lens and therefore, the following operation and effect can be achieved.

That is, when the light emitting element is assumedly arranged such that the light emitting chip is directed in the direction of the front face of the lamp, some portion of the light emitted from the light emitting chip is emitted in a direction of an angle exceeding an opening angle of the lens, and becomes light which is not controlled to deflect by the lens. Further, the light which is not utilized effectively as front irradiating light is generated over an entire periphery with regard to the optical axis.

In contrast thereto, when the light emitting chip is arranged to direct in the skewed front direction as in the light emitting element according to the invention, light directed in a direction proximate to the optical axis of the light emitted from the light emitting chip is made to be incident on the lens as light emitted in a direction of an angle equal to or smaller than the opening angle of the lens, further, most of light directed in a direction other than the direction proximate to the optical axis from the light emitting chip is made to be incident on the lens by being reflected by the reflector arranged at a vicinity of the light emitting element.

Therefore, by adopting a lamp constitution as the embodiments of the invention, most of light emitted from the light emitting chip can be utilized as front irradiating light.

At that occasion, when the lamp constitution as the embodiments of the invention is adopted, the reflector is additionally needed in comparison with the vehicle lamp of the background art. However, since the reflector is arranged at the vicinity of the light emitting element, the vehicle lamp can be maintained in the compact constitution.

In this way, according to the embodiments of the invention, in the vehicle lamp constituting the light source by the light emitting element, the efficiency of utilizing the light flux of the light source can be increased as well as achieving compact formation of the lamp.

In the above-described constitution, the reflector may be constituted to converge the light from the light emitting chip substantially to a vicinity of the optical axis at a front vicinity of the rear side focal point in the vertical face including the optical axis. By the structure, a width in an up and down direction of a light distribution pattern formed by front irradiating light from the vehicle lamp can be made to be comparatively small, thereby, a transversely-prolonged light distribution pattern suitable for the vehicle lamp can easily be provided.

In the above-described constitution, the light emitting element may be arranged such that a light emitting face of the light emitting chip substantially coincides with a linear line connecting the rear side focal point of the lens and an outer peripheral edge of an effective diameter of the lens in the vertical face including the optical axis. By the structure, most of light directly emitted from the light emitting chip can be made to be incident on the lens, thereby, the efficiency of utilizing the light flux of the light source can further be increased.

In the above-described constitution, the light emitting element may be arranged such that the light emitting chip is directed in the upper direction and a lower end edge of the light emitting chip is disposed at the rear side focal point. By the structure, a light distribution pattern having a cutoff line as an inverted projected image of the lower end edge of the light emitting chip at an upper end portion thereof can be formed.

In the above-described constitution, the light emitting element may be arranged such that the light emitting chip is directed in the upper direction and the light emitting chip is disposed at a rear vicinity of the rear side focal point, wherein a vicinity of the rear side focal point is arranged with a shade for shielding a portion of the light from the light emitting chip such that an upper end edge of the shade is disposed at a vicinity of the optical axis. By the structure, a light distribution pattern having a cutoff line as the inverted projected image of the upper end edge of the shade at an upper end portion thereof can be formed. Further, the cutoff line can be formed by an arbitrary shape and by an extremely high brightness ratio.

In the above-described constitution, although the specific shape of the lens is not particularly limited as described above, a sectional shape of the lens along a horizontal face including the optical axis may be set to a shape different from a sectional shape along the vertical face including the optical axis. By the structure, a diverging angel of a light distribution pattern in a horizontal direction can easily be increased by a light deflecting operation of the lens.

Other aspects and advantages of the invention will be apparent from the following description and the appended claims.

DETAILED DESCRIPTION OF THE EXEMPLARY EMBODIMENTS

Exemplary embodiments of the invention will be explained in reference to the drawings as follows.

Figure 1:
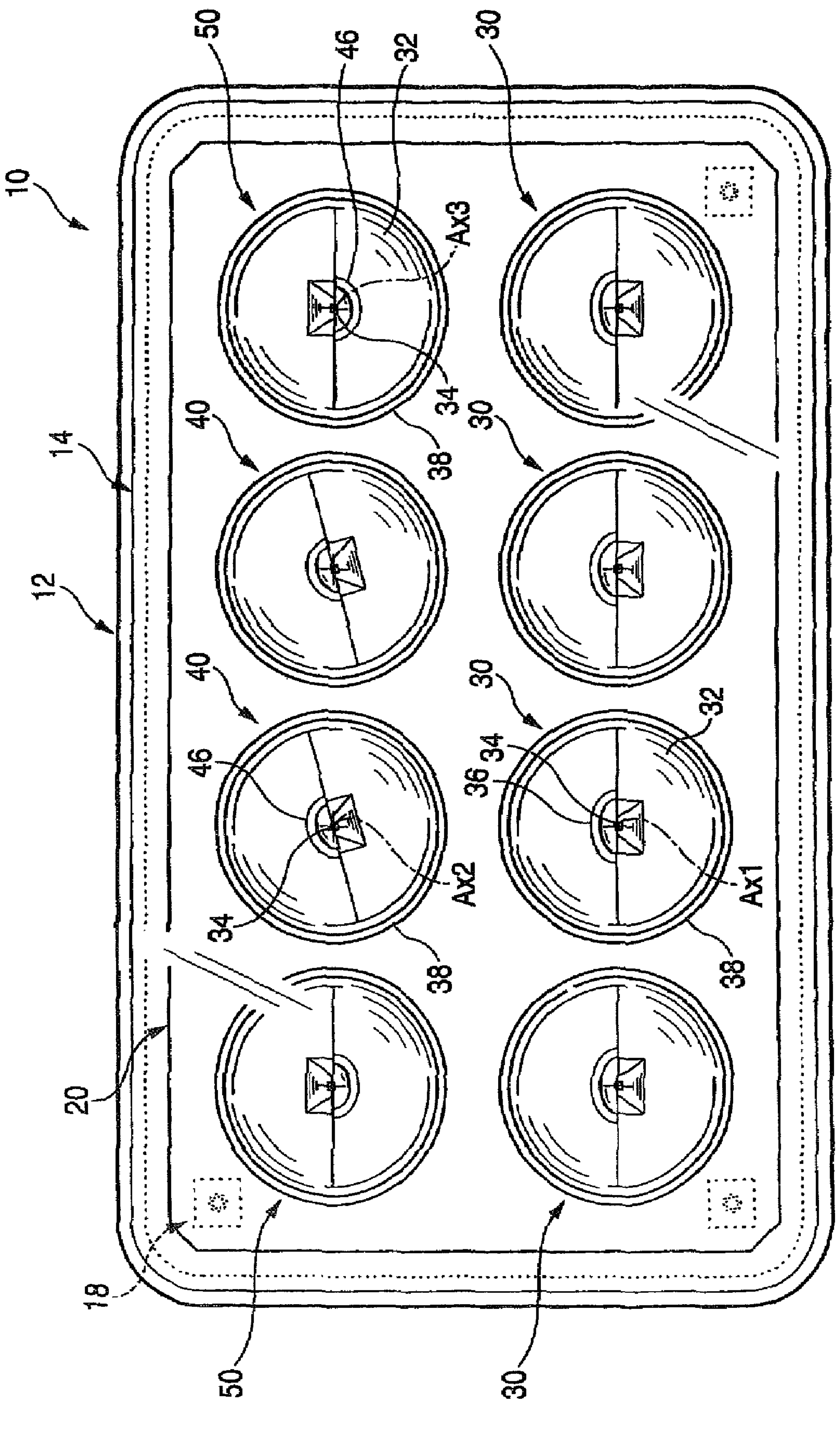
FIG. 1 is a front view showing a vehicle headlamp according to an embodiment of the invention.

FIG. 1 is a front view showing a vehicle headlamp 10 according to an exemplary embodiment of the invention.

As shown by the drawing, the vehicle headlamp 10 according to the exemplary embodiment is structured by a constitution in which eight lamp units 30, 40, 50 are contained at inside of a lamp chamber formed by a lamp body 12 and a transparent cover 14 in a transparent state attached to an opening portion of a front end of the lamp body 12 as a vehicle lamp.

The eight lamp units 30, 40, 50 are fixedly supported by a common metal made bracket 20 by upper and lower two stages arrangement. The metal made bracket 20 is formed by a shape of a vertical panel and is supported by the lamp body 12 inclinably in an up and down direction and a left and right direction by way of an aiming mechanism 18.

Among the eight lamp units 30, 40, 50, four of the lamp units 30 arranged at the lower stage are provided with constitutions the same as each other, and optical axes Ax1 of the respective lamp units 30 are arranged to extend in directions orthogonal to the metal made bracket 20. Further, two of the lamp units 40 arranged to be proximate to a center of the upper stage are provided with constitutions the same as each other and optical axes Ax2 of the respective lamp units 40 are arranged to extend in slightly left upper directions relative to the optical axes Ax1 (specifically, left direction by about 1° and upper direction by about 0.5°). Further, two of the lamp units 50 arranged on both sides of the upper stage are provided with constitutions the same as each other, and optical axes Ax3 of the respective lamp units 50 are arranged to extend in slightly lower directions relative to the optical axes Ax1 (specifically, lower directions by about 0.5°).

The eight lamp units 30, 40, 50 are arranged in a state in which the optical axes Ax1 of the respective lamp units 30 are extended in directions of lower directions relative to the front and rear direction of the vehicle by about 0.5 through 0.6° by inclining the metal made bracket 20 at a stage of finishing to adjust optical axes by the aiming mechanism 18.

Further, according to the vehicle headlamp 10 of the exemplary embodiment, a light distribution pattern for low beam is formed by illuminating light from four of the lamp units 30 and two of the lamp units 40 and a light distribution pattern for high beam is formed by illuminating light from four of the lamp units 30 and two of the lamp units 50.

Next, respective constitutions of three kinds of the lamp units 30, 40, 50 will be explained.

First, the constitution of the first lamp unit 30 will be explained.

Figure 2:
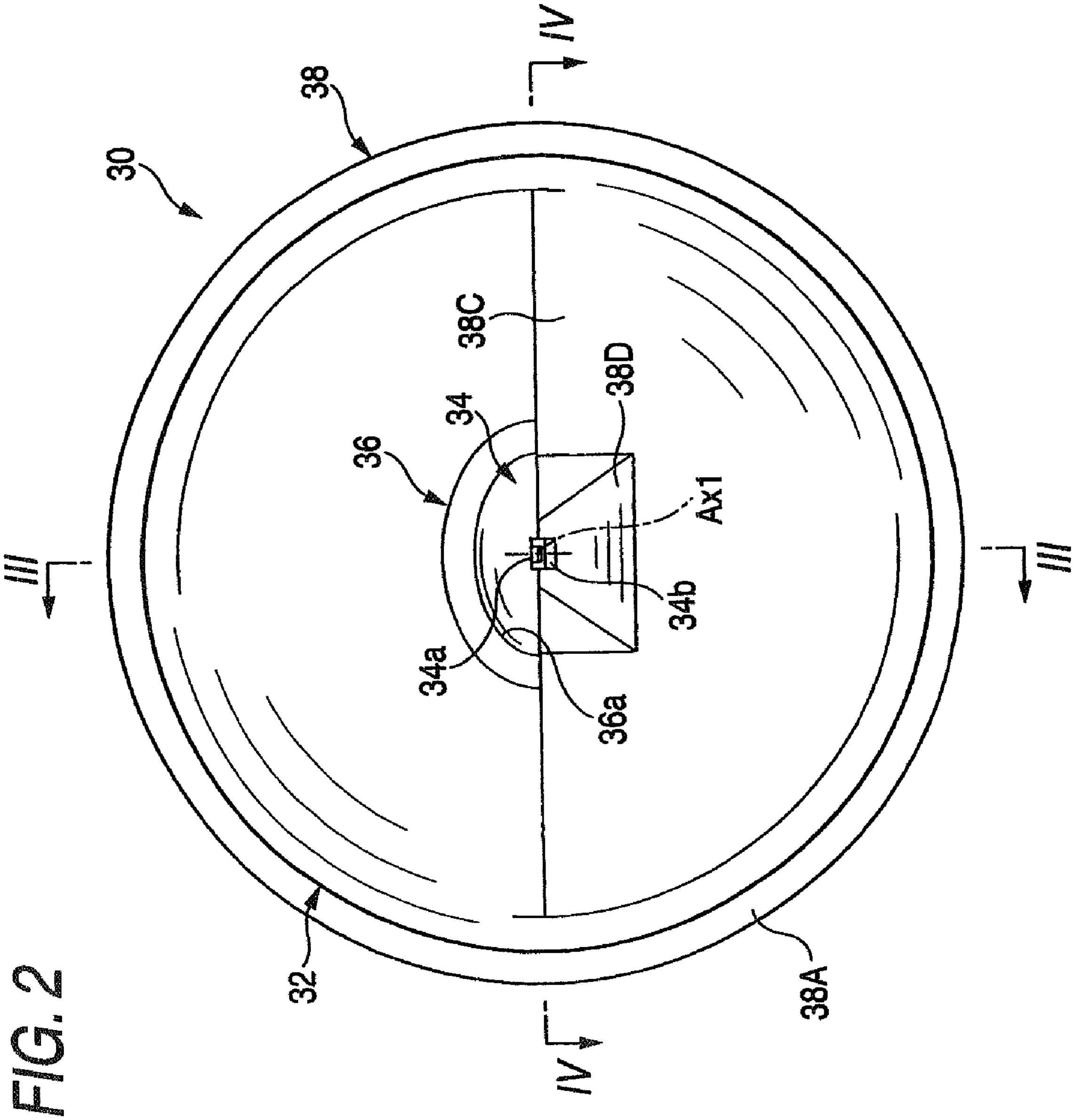
FIG. 2 is a front view showing a single piece of a first lamp unit of the vehicle headlamp.
Figure 3:
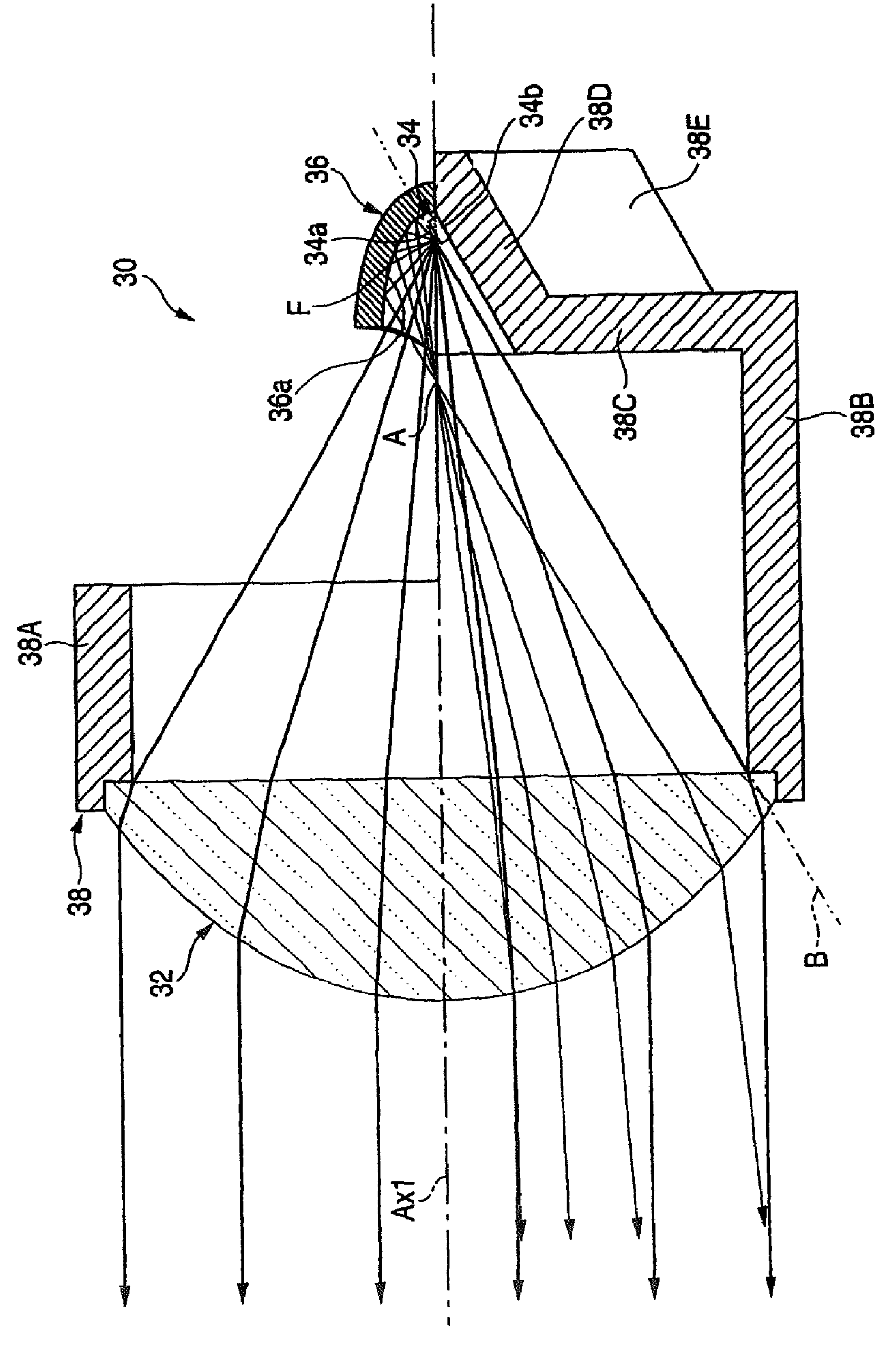
FIG. 3 is a sectional view taken along a line III-III of FIG. 2.
Figure 4:
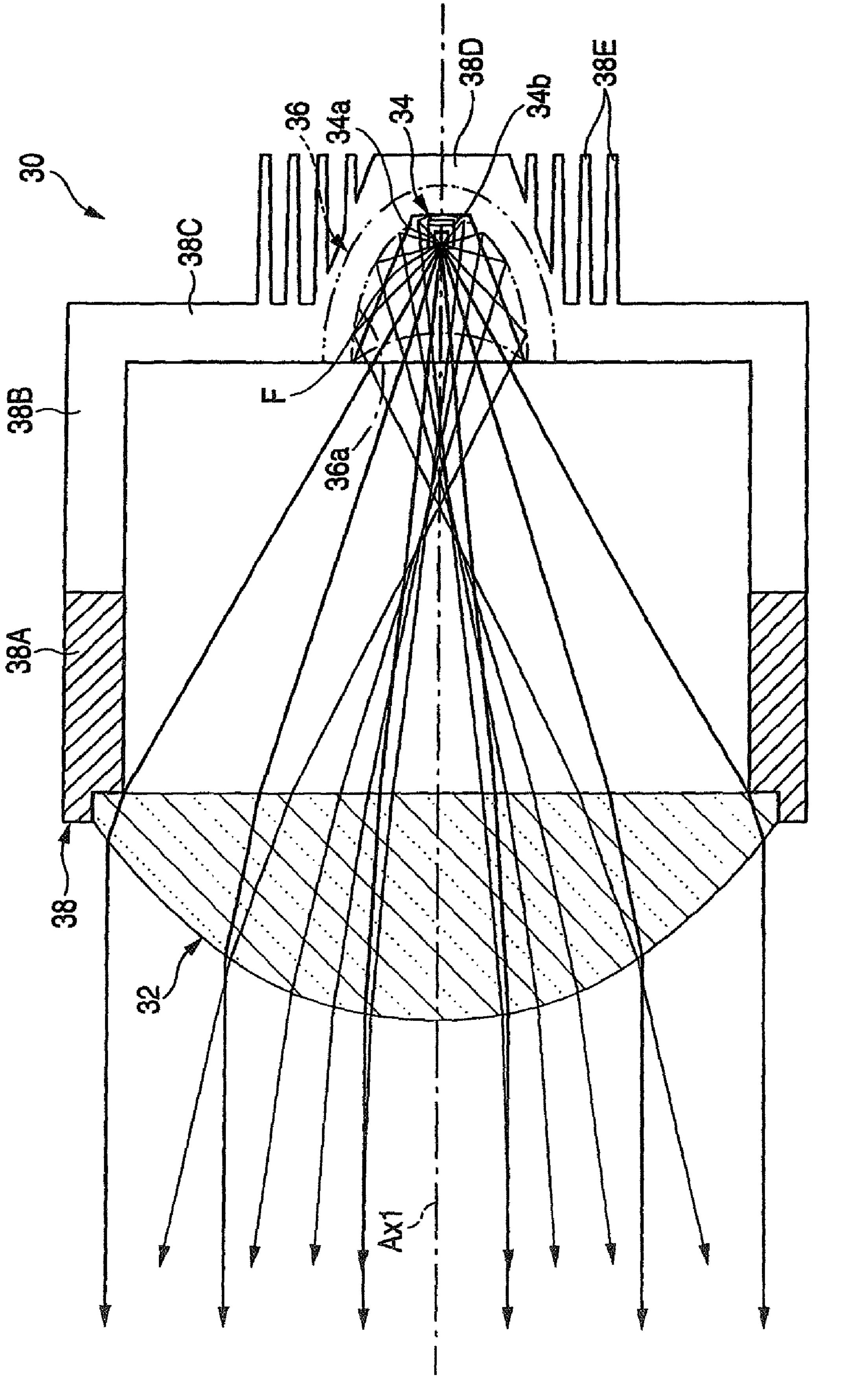
FIG. 4 is a sectional view taken along a line IV-IV of FIG. 2.
Figure 5:
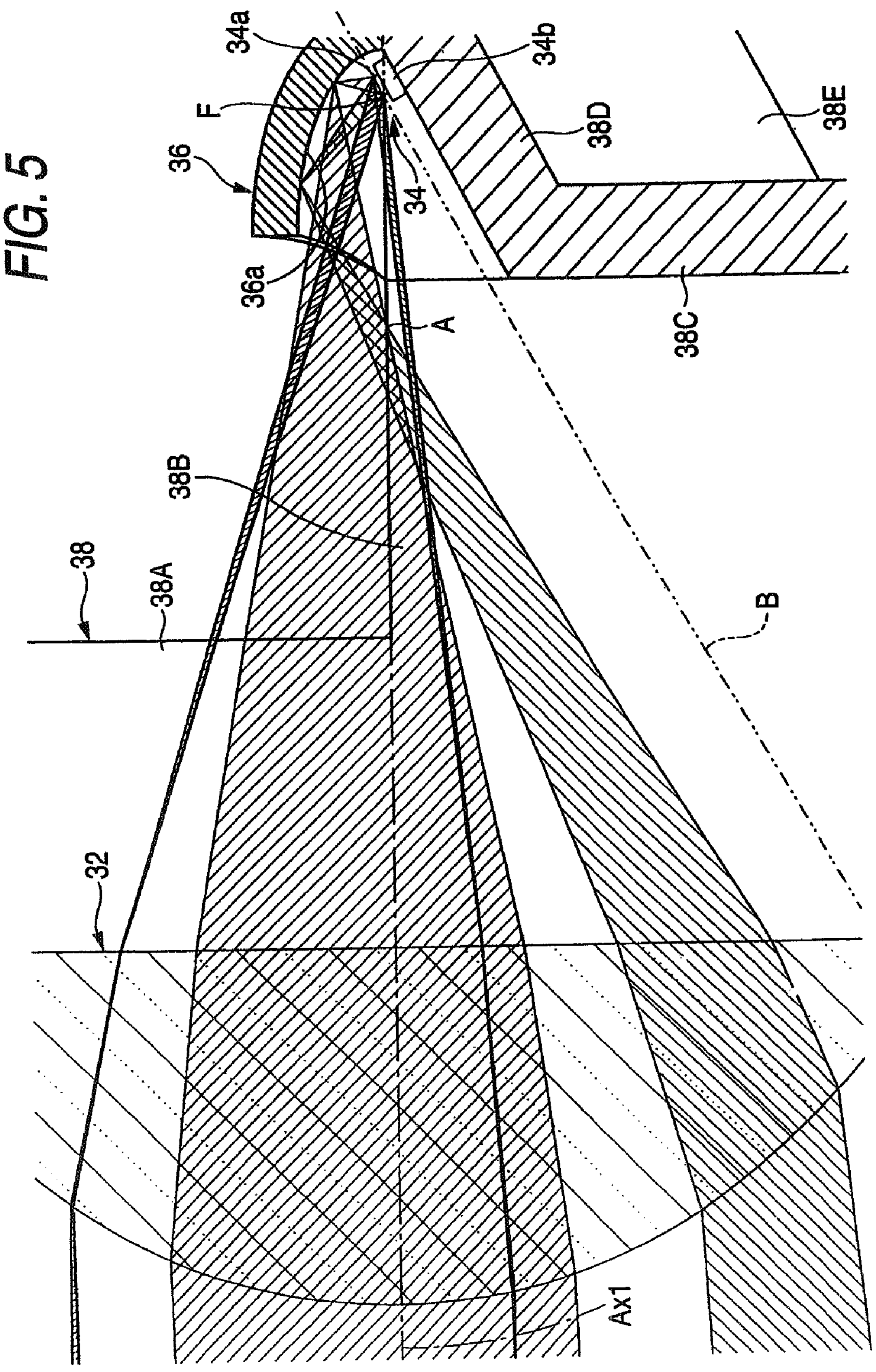
FIG. 5 is a detailed view of an essential portion of FIG. 3.

FIG. 2 is a front view showing a single piece of the lamp unit 30, FIG. 3 is a sectional view taken along a line III-III of FIG. 2, FIG. 4 is a sectional view taken along a line IV-IV of FIG. 2. Further, FIG. 5 is a detailed view of an essential portion of FIG. 3.

As shown by the drawings, the lamp unit 30 is constituted by a lens 32 arranged on the optical axis Ax1 extended in the front and rear direction of the lamp, a light emitting element 34 arranged on a rear side of the lens 32, a reflector 36 arranged at a vicinity of the light emitting element 34, and a holder 38 for fixedly supporting the lens 32, the light emitting element 34 and the reflector 36.

The lens 32 is a flat convex aspherical face lens a front side surface of which is constituted by a convex face and a rear side surface of which is constituted by a flat face, and is constituted as a projecting lens for projecting an image on a rear side focal face including a rear side focal point F thereof onto a vertical imaginary screen arranged on the front side of the lamp as the inverted image. The lens 32 is fixedly supported by a ring-like groove portion of a front end of a cylindrical portion 38A at a peripheral edge portion thereof and an effective diameter of the lens 32 is rectified by an inner diameter of the cylindrical portion 38A.

The light emitting element 34 is a white light emitting diode and is constituted by a light emitting chip 34*a* having a light emitting face of a square shape of about 1 mm square, and a board 34*b* supporting the light emitting chip 34*a*. At that occasion, the light emitting chip 34*a* is sealed by a thin film formed to cover the light emitting face.

The light emitting element 34 is arranged at a vicinity of the rear side focal point F in a state of directing the light emitting chip 34*a* in a skewed front direction of being inclined in an upper direction relative to the direction of the front face of the lamp by a predetermined angle. At that occasion, the light emitting element 34 is arranged in a state in which a lower end edge of the light emitting chip 34*a* is disposed at the rear side focal point F and extended in a horizontal direction. Further, the light emitting element 34 is arranged such that the light emitting face of the light emitting chip 34*a* substantially coincides with a linear line B connecting the rear side focal point F and a lower end point of an outer peripheral edge of the effective diameter of the lens 32 (that is, a front end edge of an inner peripheral face of the cylindrical portion 38A of the holder 38). Further, at this occasion, the light emitting element 34 is arranged such that the light emitting face of the light emitting chip 34*a* is inclined in an upper direction relative to the direction of the front face of the lamp by about 60°.

The reflector 36 is formed by a shape of a half dome to cover the light emitting element 34 from an upper side and a lower end face of a peripheral edge thereof is disposed on a horizontal face including the optical axis Ax1. Further, the reflector 36 reflects light from the light emitting chip 34*a* to the lens 32 to be proximate to the optical axis Ax1. Specifically, the reflecting face 34*a* of the reflector 36 is set to an elliptical shape in a sectional shape thereof including the optical axis Ax1, and an eccentricity thereof is set to gradually increase from a vertical section to a horizontal section. Further, the reflecting face 36*a* converges light from a point disposed at a rear side focal point F of the light emitting chip 34*a* to point A on the optical axis Ax1 on a slightly front side of the rear side focal point F in a vertical face and converges the light onto the optical axis Ax1 substantially on a front side of point A in a horizontal section thereof.

The holder 38 is constituted as a metal made member and is constituted by the cylindrical portion 38A and a semicylindrical portion 38B extended in a shape of a semicylinder from the cylindrical portion 38A to a rear side on a lower side of the optical axis Ax1, a vertical portion 38C formed in a semicircular shape along a vertical face orthogonal to the optical axis Ax1 at a rear end portion of the semicylindrical portion 38B, and an inclined face portion 38D extended to a rear side in a skewed upper direction at a center portion of an upper end of the vertical portion 38C, and a plurality of heat radiating fins 38E extended from the vertical portion 38C to a rear side in a shape of a vertical stripe at the inclined face portion 38D and a periphery thereof.

The light emitting element 34 is fixedly mounted to a rear end portion of an upper face of the inclined face portion 38D of the holder 38 at a lower face of the board 34*b*. Further, the reflector 36 is fixedly mounted to an upper end face of a peripheral edge of the inclined face portion 38D at a lower end face of a peripheral edge thereof. Further, the lamp unit 30 is fixedly supported by the metal made bracket 20 at the holder 38.

As described above, the light emitting chip 34*a* is arranged to direct in the upper direction torward the skewed front direction, the lower end edge is extended in the horizontal direction orthogonal to the optical axis Ax1 to pass the rear side focal point F and therefore, as shown by FIG. 3 and FIG. 5, light incident on the lens 32 as directly emitted light in light emitted from the light emitting chip 34*a* is emitted from the lens 32 to the front side of the lamp as a light ray flux diverged in a lower direction by an angle of emittance in a narrow angle range from a direction in parallel with the optical axis Ax1 to a slightly downward direction, on the other hand, light incident on the lens 32 by being reflected by the reflecting face 36*a* of the reflector 36 is emitted from the lens 32 to the front side of the lamp as a light ray flux diverged in a lower direction by an angle of emittance in an angle range from the direction in parallel with the optical axis Ax1 to a downward direction to some degree with regard to an up and down direction.

Further, as shown by FIG. 4, light incident on the lens 32 as directly emitted light in light emitted from the light emitting chip 34*a* is emitted from the lens 32 to the front side of the lamp as a light ray flux diverged to both left and right sides by an angle of emittance in an angle range in accordance with a size of the light emitting chip 34*a* in a direction in parallel with the optical axis Ax1 in a horizontal direction, on the other hand, light incident on the lens 32 by being reflected by the reflecting face 36*a* of the reflector 36 is emitted from the lens 32 to the front side of the lamp as a light ray flux diverged to both left and right sides by an angle of emittance in a considerably large angle range in the horizontal direction since the eccentricity of the reflecting face 36*a* is increased in the horizontal direction.

Figure 6:
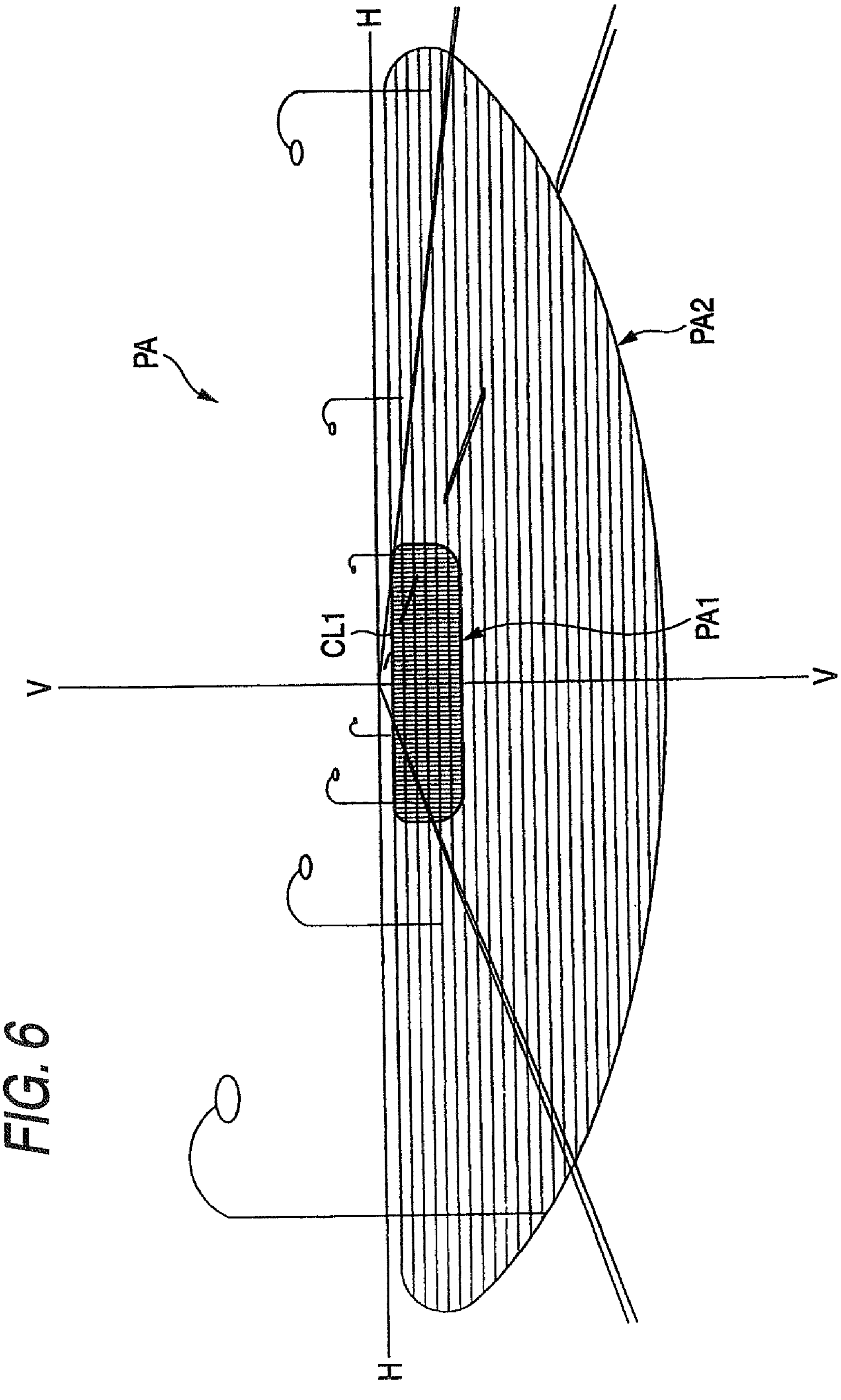
FIG. 6 is a diagram perspectively showing a light distribution pattern formed on an imaginary vertical screen arranged at a position 15*m* frontward from the lamp by light irradiated from the first lamp unit to a front side.

FIG. 6 is a diagram perspectively showing a light distribution pattern PA formed on an imaginary vertical screen arranged at a position 25*m* frontward from the lamp by light irradiated from the lamp unit 30 to the front side.

As shown by the drawing, the light distribution pattern PA is formed as a light distribution pattern synthesized with a light distribution pattern PA1 and a light distribution pattern PA2.

The light distribution pattern PA1 is a light distribution pattern formed by light incident on the lens 32 from the light emitting chip 34*a* as directly emitted light, and formed as a small light distribution pattern in a transversely-prolonged rectangular shape as an inverted projected image of the light emitting chip 34*a* by the lens 32. At that occasion, the light emitting chip 34*a* is extended in the horizontal direction orthogonal to the optical axis Ax1 to pass the rear side focal point F at the lower end edge and therefore, an upper end edge of the light distribution pattern PA1 is formed as a horizontal cutoff line CL1 having a high brightness ratio.

At that occasion, the horizontal cutoff line CL1 is formed to be disposed to a lower side of H-H line passing H-V constituting a vanishing point in the direction of the front face of the lamp in a horizontal direction by about 0.5 through 0.6 degree. This is because the optical axis Ax1 of the lamp unit 30 is arranged in a state of being extended in a downward direction relative to the front and rear direction of the vehicle by about 0.5 through 0.6°.

On the other hand, the light distribution pattern PA2 is a light distribution pattern formed by light from the light emitting chip 34*a* incident on the lens 32 after being reflected by the reflecting face 36*a* of the reflector 36 and is formed as a light distribution pattern substantially in a bow-like shape and considerably diverged in the left and right direction. At that occasion, reflected light from the reflector 36 is emitted from the lens 32 to the front side of the lamp as a light ray flux diverged in a lower direction by an angle of emittance of an angle range from the direction in parallel with the optical axis Ax1 to the downward direction to some degree and therefore, an upper end edge of the light distribution pattern PA2 informed substantially in flush with the horizontal cutoff line CL1 and extended in the horizontal direction.

Figure 7:
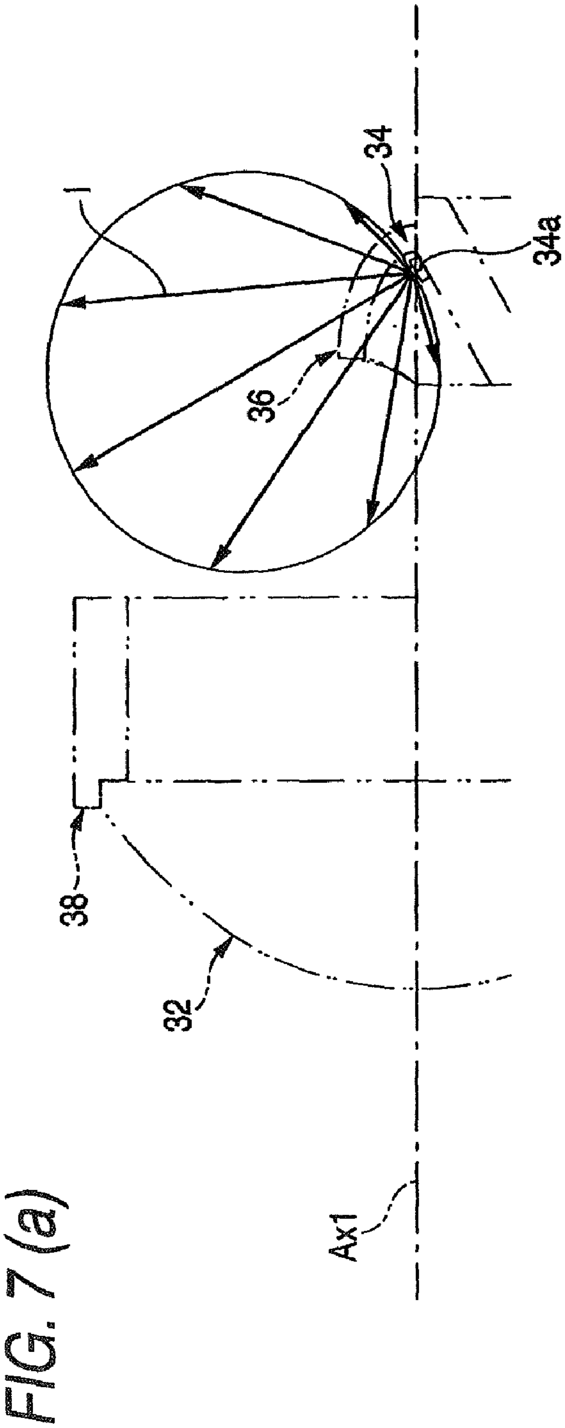
FIGS. 7(*a*) and 7(*b*) illustrate diagrams showing a light distribution of light emitted from a light emitting chip of a light emitting element of the first lamp unit, FIG. 7(*a*) is a diagram showing a luminous intensity distribution, FIG. 7(*b*) is a diagram showing a luminance distribution.
Figure 7:
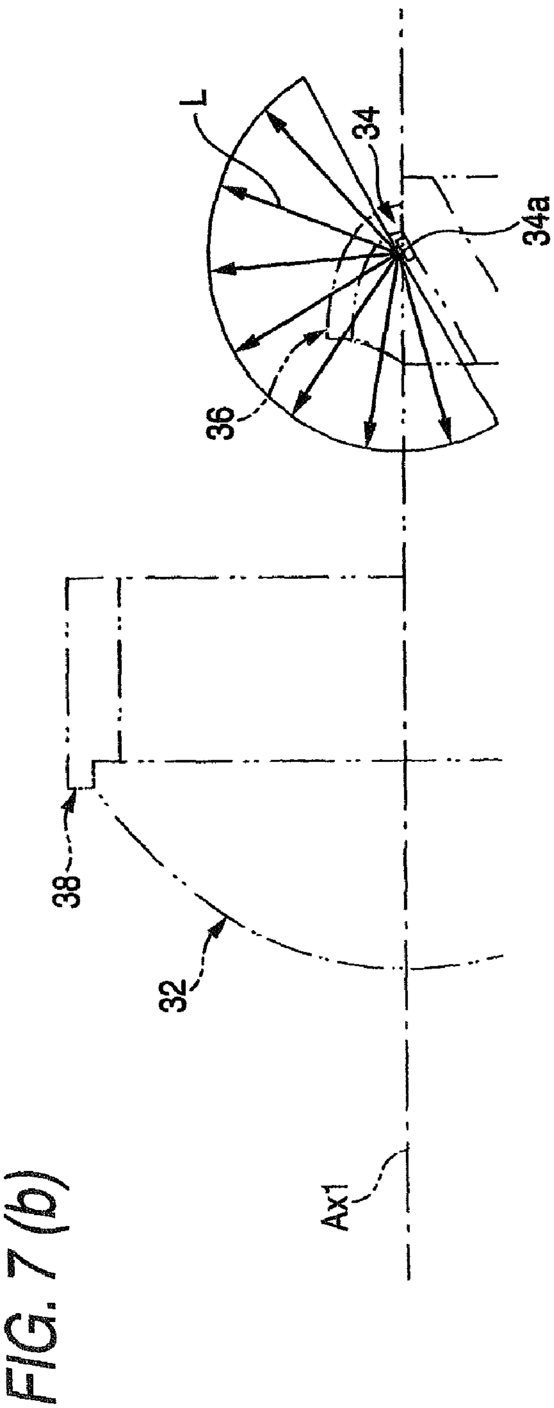

FIGS. 7(*a*) and 7(*b*) illustrate diagrams showing a light distribution of emitted light from the light emitting chip 34*a*, FIG. 7(*a*) shows a luminous intensity distribution and FIG. 7(*b*) shows a luminance distribution.

The light emitting chip 34*a* emits light by face emittance in the light emitting face and therefore, whereas as shown by FIG. 7(*a*), a luminous intensity I of the light emitting chip 37*a* is the highest in a direction orthogonal to the light emitting face and is gradually lowered as increasing an angle from the orthogonal direction, as shown by FIG. 7(*b*), a luminance L of the light emitting chip 34*a* is constant regardless of the angle relative to the light emitting face.

Further, the luminous intensity at each point of the light distribution pattern PA1 formed on the imaginary vertical screen by light incident on the lens 32 from the light emitting chip 34*a* as directly emitted light is determined by a product of the luminance L of the light emitting chip 34*a* by an effective diameter area of the lens 32 and therefore, as shown by the drawing, even when the light emitting chip 34*a* is inclined upwardly relative to the direction of the front face of the lamp, the luminance becomes a value the same as that when the light emitting chip 34*a* is directed in the direction of the front face of the lamp.

Next, a constitution of the second lamp unit 40 will be explained.

Figure 8:
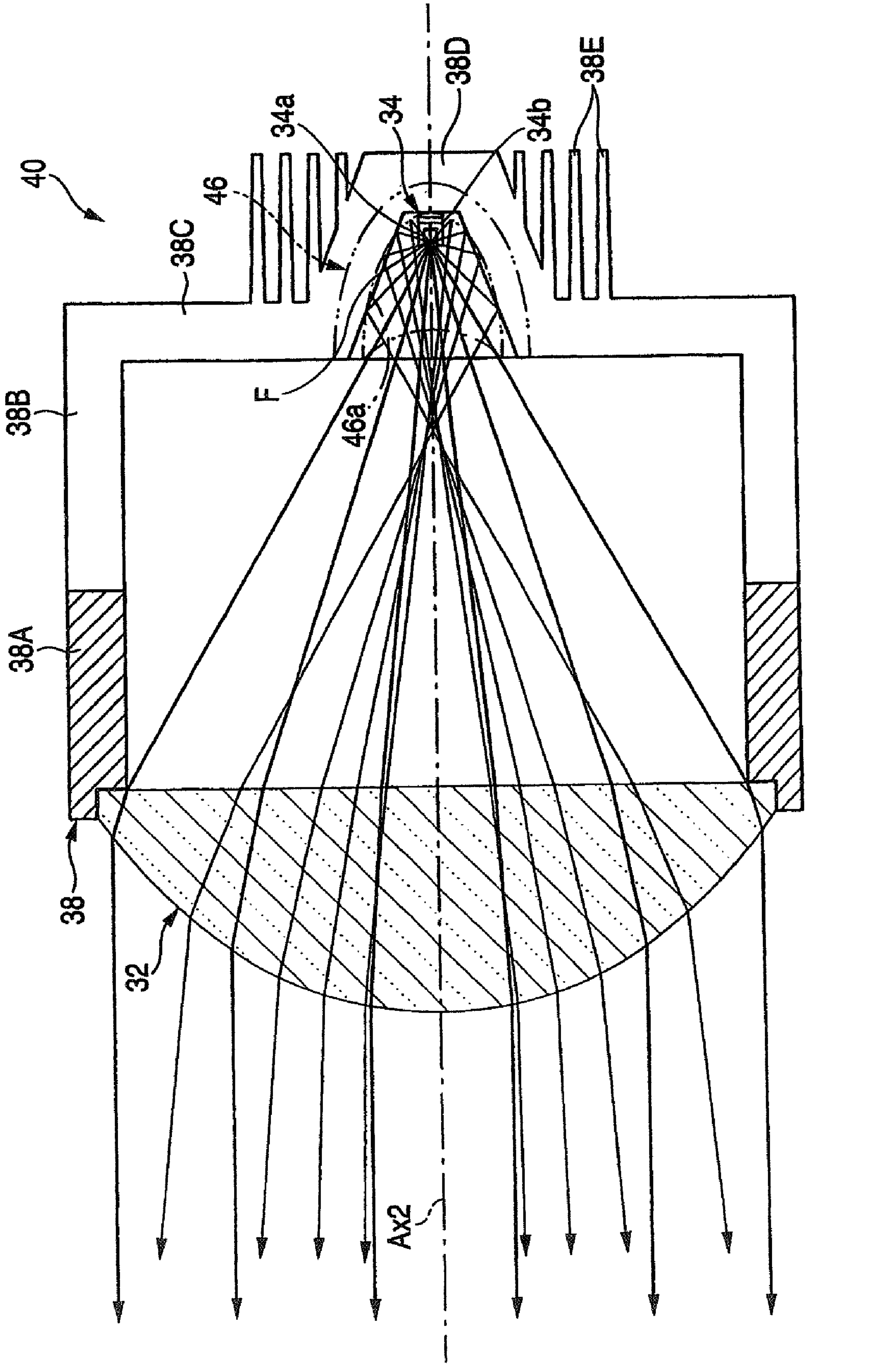
FIG. 8 is a view similar to FIG. 4 showing a single piece of a second lamp unit of the vehicle headlamp.

FIG. 8 is a view similar to FIG. 4 showing a single piece of the lamp unit 40.

Although as shown also by the drawing, a basic constitution of the lamp unit 40 is similar to that of the lamp unit 30, a constitution of a reflector 46 thereof differs from that in the case of the lamp unit 30.

That is, the reflector 46 is formed in a shape of a half dome to cover the light emitting element 34 from the upper side similar to the reflector 36 of the lamp unit 30, and a lower end face of a peripheral edge thereof is disposed on a horizontal face including an optical axis Ax2. Further, the reflector 46 reflects light from the light emitting chip 34*a* of the light emitting element 34 to the front side to be proximate to the optical axis Ax2.

Specifically, a reflecting face 46 of the reflector 46 is set to an elliptical shape in a sectional shape thereof including the optical axis Ax2, an eccentricity thereof is set to increase gradually from a vertical section to a horizontal section. At that occasion, although a vertical sectional shape of the reflecting face 46 of the reflector 46 including the optical axis Ax2 is quite similar to that in the case of the reflecting face 36*a* of the reflector 36, a horizontal sectional shape including the optical axis Ax2 is formed by an eccentricity slightly smaller than that in the case of the reflecting face 36*a* of the reflector 36. Further, thereby, the reflecting face 46*a* substantially converges light from a point disposed at the rear side focal point F of the light emitting chip 34*a* onto the optical axis Ax2 on a side slightly rearward from that in the case of the reflecting face 36*a* in the horizontal section.

Further, as shown FIG. 1, the lamp unit 40 is brought into a state of being rotated right-handedly (left-handedly in view from the front face of the lamp) by 15° from a state shown by a plane view in FIG. 8 centering on the optical axis Ax2 and is fixedly supported by the metal made bracket 20 in a state in which the optical axis Ax2 is extended slightly in a left upper direction relative to the optical axis Ax1 as described above.

Next, a constitution of the third lamp unit 50 will be explained.

Although the constitution per se of the lamp unit 50 is quite similar to that of the lamp unit 40, as shown by FIG. 1, the lamp unit 50 is fixedly supported by the metal made bracket 20 in a state of rotating the lamp unit 40 right-handedly by 165° (that is, an arrangement of making the lamp unit 30 upside down), further, as described above, in a state in which an optical axis Ax3 is extended slightly in a lower direction relative to the optical axis Ax1.

Figure 9:
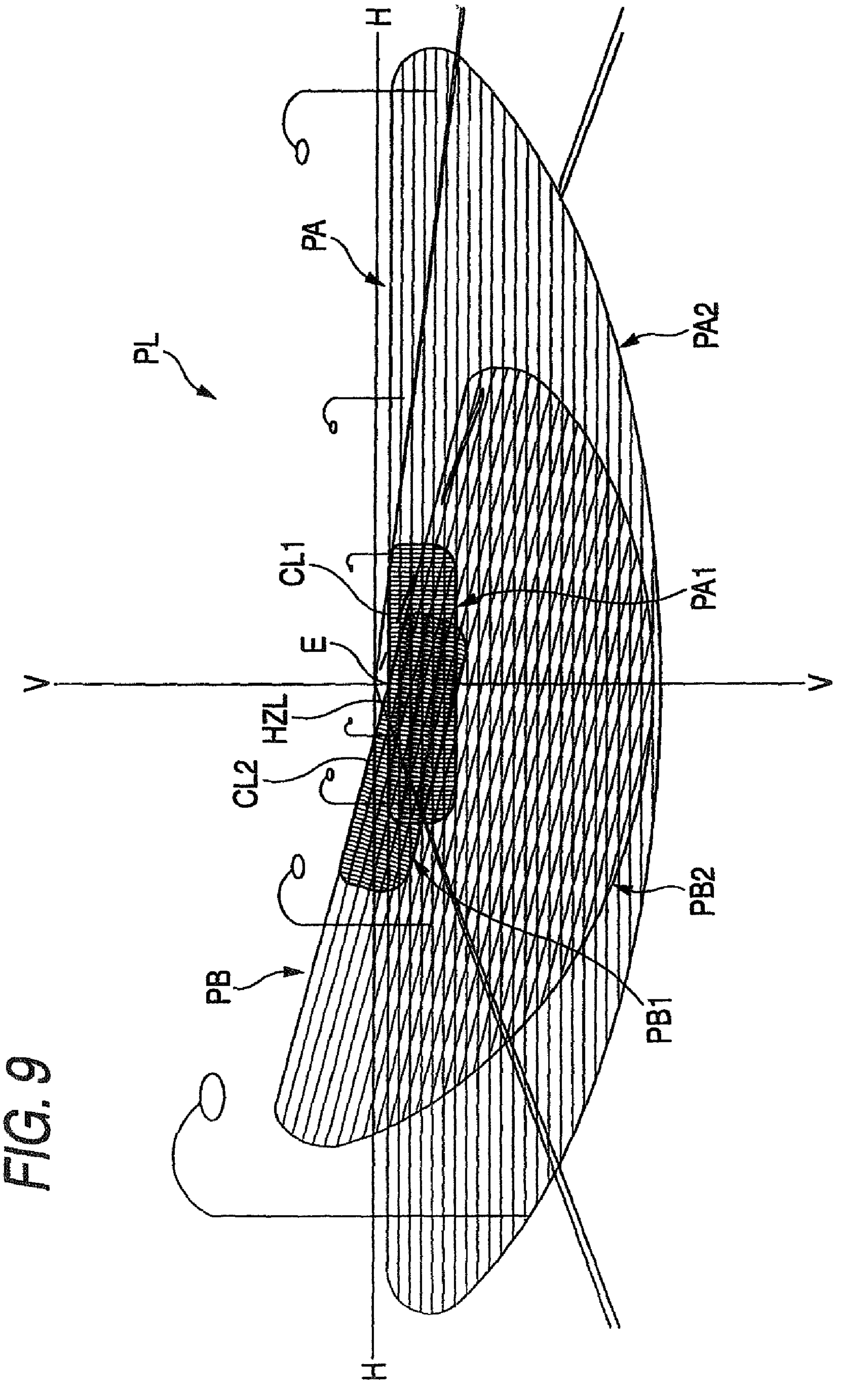
FIG. 9 is a diagram perspectively showing a light distribution pattern for low beam formed on the imaginary vertical screen by light irradiated from the vehicle headlamp to the front side.

FIG. 9 is a diagram perspectively showing a light distribution pattern PL for low beam formed on the imaginary vertical screen by light irradiated from the vehicle headlamp 10 according to the embodiment to the front side.

The light distribution pattern PL for low beam is a light distribution pattern for low beam of left light distribution pattern, and is formed as a light distribution pattern synthesized with a light distribution pattern quadruply superposed with the light distribution patterns PA (refer to FIG. 6) formed by light irradiated from the respective lamp units 30, and a light distribution pattern doubly superposed with light distribution patterns PB formed by light irradiated from the respective lamp units 40.

As shown by the drawing, the light distribution pattern PB is formed as a light distribution pattern synthesized with a light distribution pattern PB1 and a light distribution pattern PB2.

The light distribution pattern PB1 is a light distribution pattern formed by light incident on the lens 32 from the light emitting chip 34*a* as directly emitted light and is formed as a small light distribution pattern in a transversely-prolonged rectangular shape as an inverted projected image of the light emitting chip 34*a* by the lens 32.

At this occasion, although the shape per se of the light distribution pattern PB1 is quite similar to that of the light distribution pattern PA1 of the light distribution pattern PA, the light distribution pattern PB1 is formed at a position slightly left upper side relative to the light distribution pattern PA1, further, an upper end edge thereof is extended in a direction of being inclined right-handedly to the horizontal direction by 15° as a skewed cutoff line CL2 having a high brightness ratio. Further, the skewed cutoff line CL2 is intersected with the horizontal cutoff line CL1 on V-V line passing H-V in the vertical direction. This is because the lamp unit 40 is arranged in a state of being rotated right-handedly by 15° centering on the optical axis Ax2, further, the optical Ax2 is extended slightly in a left upper direction relative to the optical axis Ax1.

On the other hand, the light distribution pattern PB2 is a light distribution pattern formed by light from the light emitting chip 34*a* incident on the lens 32 after having been reflected by the reflecting face 46*a* of the reflector 46, and is formed as a light distribution pattern substantially in a bow-like shape and slightly considerably diverged in a direction inclined relative to the horizontal direction right-handedly by 15°, and the upper end edge thereof is formed to be substantially in flush with the skewed cutoff line CL2 and extended in a direction inclined by 15°. At that occasion, an angle of diverging the light distribution pattern PB2 in the direction inclined by 15° is smaller than the angle of diverging the light distribution pattern PA2 in the horizontal direction owing to a difference between the shapes of the reflecting face 46*a* of the reflector 46 and the reflecting face 36*a* of the reflector 36.

In this way, the light distribution pattern PL for low beam is formed as the light distribution pattern having the horizontal cutoff line CL1 and the skewed cutoff line CL2 at the upper end portion by the light distribution pattern PA and the light distribution pattern PB, further, a hot zone HZL constituting a high luminous intensity region is formed to surround an elbow point E constituting an intersection of the two cutoff lines CL1, CL2 by the light distribution pattern PA1 and the light distribution pattern PB1.

Figure 10:
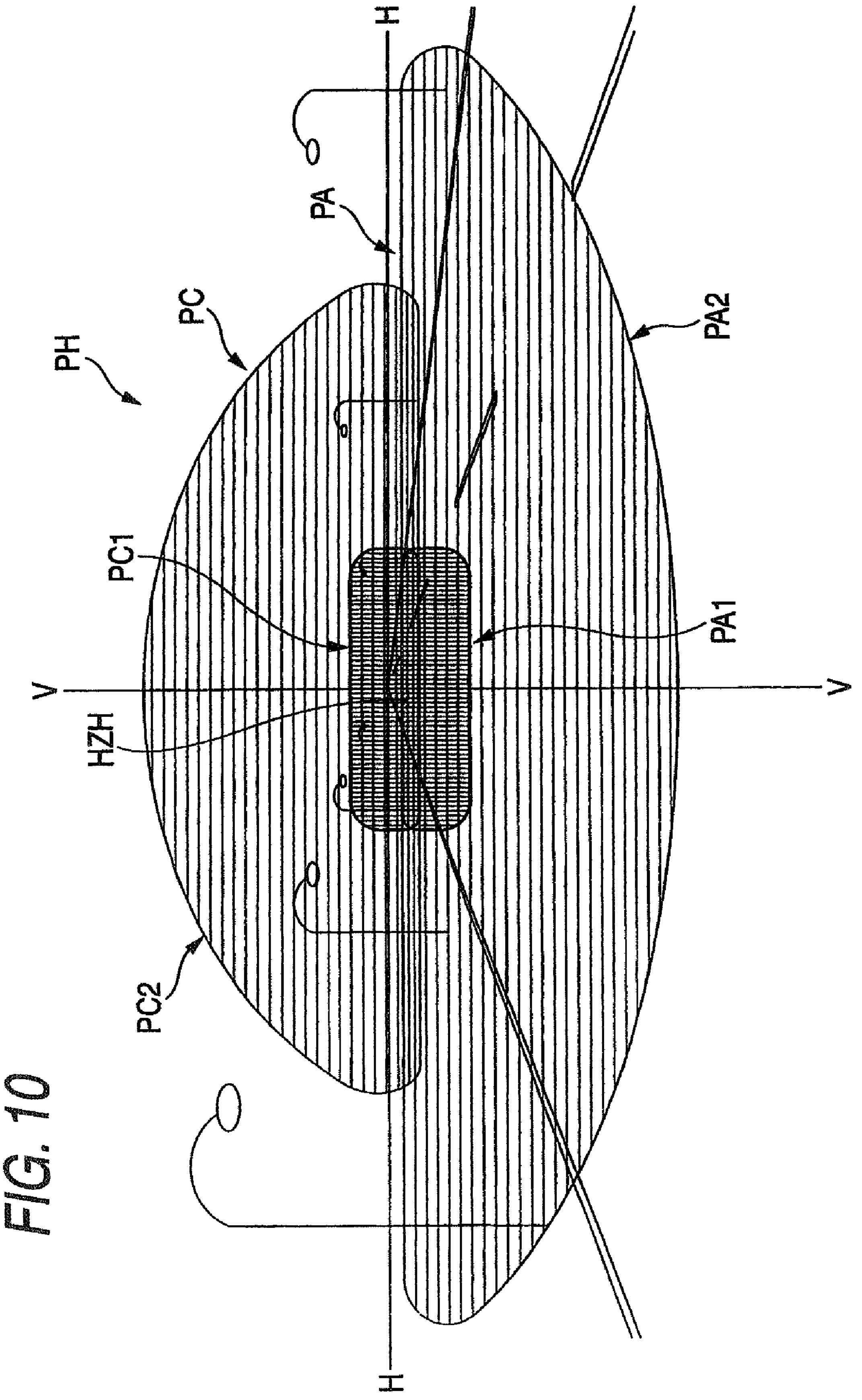
FIG. 10 is a diagram perspectively showing a light distribution pattern for high beam formed on the imaginary vertical screen by light irradiated from the vehicle headlamp to the front side.

FIG. 10 is a diagram perspectively showing a light distribution pattern PH for high beam formed on the imaginary vertical screen by light irradiated from the vehicle headlamp 10 according to the embodiment to the front side.

The light distribution pattern PH for high beam is formed as a light distribution pattern synthesized with the light distribution pattern quadruply superposed with the light distribution patterns PA formed by light irradiated from the respective lamp units 30, and a light distribution pattern doubly superposed with light distribution patterns PC formed by light irradiated from the respective lamp units 50.

As shown by the drawing, the light distribution pattern PC is formed as a light distribution pattern synthesized with alight distribution pattern PC1 and a light distribution pattern PC2, and is formed to partially overlap the light distribution pattern PA by an arrangement of making the light distribution pattern PA upside down. This is because the lamp unit 50 is constituted by an arrangement of making the lamp unit 30 upside down, further, the optical axis Ax3 is extended slightly in a lower direction relative to the optical axis Ax1.

At that occasion, the shape per se of the light distribution pattern PC1 is quite similar to that of the light distribution pattern PB1 of the light distribution pattern PB, further, the shape per se of the light distribution pattern PC2 is quite similar to that of the light distribution pattern PB2 of the light distribution pattern PB. This is because the constitution per se of the lamp unit 50 is quite similar to that of the lamp unit 40.

In this way, the light distribution pattern PH for high beam is formed as a light distribution pattern diverged considerably in the left and right direction and diverged also in the up and down direction to some degree substantially centering on H-V by the light distribution pattern PA and the light distribution pattern PC, further, a hot zone HZH is formed at a vicinity of H-V by the light distribution pattern PA1 and the light distribution pattern PC1.

As described above in details, the first lamp unit 30 constituting the vehicle headlamp 10 according to the exemplary embodiment is structured by a compact constitution including the lens 32 arranged on the optical axis Ax1 extended in the front and rear direction of the lamp and the light emitting element 34 arranged rearward therefrom, the lens 32 is set to the shape of the convex lens having the rear side focal point F on the optical axis Ax1 in the sectional shape along the vertical face including the optical axis Ax1, further, the light emitting element 34 is arranged at a vicinity of the rear side focal point F of the lens 32 in a state of directing the light emitting chip 34*a* in the skewed front direction of being inclined in the upper direction relative to the direction of the front face of the lamp by the predetermined angle, further, a vicinity of the light emitting element 34 is arranged with the reflector 36 for reflecting light from the light emitting chip 34*a* to the lens 32 and therefore, the following operation and effect can be achieved.

That is, the light emitting element 34 is arranged to direct the light emitting chip 34*a* in the skewed front direction and therefore, light directed in the direction of being proximate to the optical axis Ax1 in light emitted from the light emitting chip 34*a* is incident on the lens 32 as light emitted in the direction of the angle equal to or smaller than the opening angle of the lens 32, further, also most of light directed in a direction other than the direction proximate to the optical axis Ax1 from the light emitting chip 34*a* is incident on the lens 32 by the reflector 36 arranged at a vicinity of the light emitting element 34. Further, thereby, most of light emitted from the light emitting chip 34*a* can be utilized as front irradiating light.

At that occasion, the reflector 36 is formed by a considerably small size at a vicinity of the light emitting element 34 and therefore, the lamp unit 30 can be maintained in a compact constitution.

In this way, according to the exemplary embodiment, an efficiency of utilizing a light flux of a light source can be promoted after achieving compact formation of the lamp unit 30.

Further, the lamp unit 30 is structured by a constitution of substantially converging light from the light emitting chip 34*a* to a vicinity of the optical axis Ax1 at a front vicinity of the rear side focal point F of the lens 32 in the vertical face including the optical axis Ax1 as the reflector 36 and therefore, a width in the up and down direction of the light distribution pattern PA formed by front irradiating light from the lamp unit 30 can be made to be comparatively small, thereby, the transversely-prolonged light distribution pattern PA suitable for the vehicle lamp can easily be provided.

Further, according to the lamp unit 30, as the light emitting element 34, the light emitting face of the light emitting chip 34*a* is arranged to substantially coincide with the linear line B connecting the rear side focal point F of the lens 32 and the outer peripheral edge of the effective diameter of the lens 32 in the vertical face including the optical axis Ax1 and therefore, most of light directly emitted from the light emitting chip 34*a* can be made to incident on the lens 32, thereby, the efficiency of utilizing the light flux of the light source can further be promoted.

Further, according to the light emitting element 34, the lower end edge of the light emitting chip 34*a* is arranged to be disposed at the rear side focal point F of the lens 32 and therefore, the light distribution pattern PA can be made to include the cutoff line as the inverted projected image of the lower end edge of the light emitting chip 34*a* at the upper end portion. At that occasion, the light emitting chip 34*a* includes the light emitting face in a square shape and therefore, the cutoff line as the inverted projected image of the lower end edge can be formed as the horizontal cutoff line CL1.

Further, as described above, the luminous intensity of each point of the light distribution pattern PA1 formed by light incident on the lens 32 from the light emitting chip 34*a* as directly emitted light is constituted by a value the same as that in the case of directing the light emitting chip 34*a* in the direction of the front face of the lamp even when the light emitting chip 34*a* is inclined in the upper direction and therefore, a center luminous intensity of the light distribution pattern PA is not reduced by adopting the constitution of the lamp unit 30.

Further, the lamp unit 30 is fixedly supported by the metal made bracket 20 at the holder 38 and therefore, heat generated by the light emitting element 34 can be conducted to the metal made bracket 20 having a large heat capacity by way of the holder 38, thereby, a temperature of the light emitting element 34 can be prevented from being elevated excessively beforehand. Further, the vertical portion 38C of the holder 38 is formed with the plurality of heat radiating fins 38E extended to the rear side in the vertical stripe shape at the inclined face portion 38D and a periphery thereof and therefore, the heat generated by the light emitting element 34 can be radiated, thereby, the temperature rise of the light emitting element 34 can further effectively be restrained.

Operation and effect similar to that of the case of the first lamp unit 30 can be achieved also in the second lamp unit 40 and the third lamp unit 50 constituting the vehicle headlamp 10 according to the exemplary embodiment.

The vehicle headlamp 10 according to the exemplary embodiment includes 8 of the lamp units 30, 40, 50, the light distribution pattern PL for low beam is formed by irradiating light from four of the lamp unit 30 and two of the lamp units 40, the light distribution pattern PH for high beam is formed by irradiating light from four of the lamp units 30 and two of the lamp units 50, the respective lamp units 30, 40, 50 are provided with the high efficiency of utilizing the light flux of the light source and therefore, a lamp function as the vehicle headlamp can be achieved by the comparatively small number of the lamp units.

Further, the vehicle headlamp 10 according to the exemplary embodiment is structured by a constitution of containing 8 of the lamp units 30, 40, 50 all of which are constituted to be compact at inside of the lamp chamber formed by the lamp body 12 and the transparent cover 14 in two upper and lower stages and therefore, the vehicle lamp 10 can be constituted as a thin type lamp.

Although according to the exemplary embodiment, an explanation has been given such that the light emitting chip 34*a* of the light emitting element 34 includes the light emitting face in the square shape of about 1 mm square, a light emitting chip having a light emitting face of other size or shape can naturally be used.

Instead of forming the light distribution pattern PH for high beam by irradiating light from four of the lamp units 30 and two of the lamp units 50 as in the exemplary embodiment, the light distribution pattern PH for high beam can also be structured by a constitution of being formed by irradiating light from 8 of the lamp units 30, 40, 50. By adopting such a constitution, a light distribution pattern for high beam brighter than the light distribution pattern PH for high beam can be formed.

Further, although according to the exemplary embodiment, an explanation has been given such that 8 of the lamp units 30, 40, 50 are arranged in two upper and lower stages, a constitution having other number of pieces or arrangement can naturally be structured.

Further, although an explanation has been given such that according to the respective lamp units 30, 40, 50 of the exemplary embodiment, all of the vertical sectional shapes and the horizontal sectional shapes of the reflecting faces 34*a*, 46*a* of the reflectors 36, 46 are set to the elliptical shape, one or both of the vertical sectional shape and the horizontal sectional shape can be set to a shape of a curved line other than the elliptical shape (for example, parabola shape, hyperbola shape or the like).

Next, modified examples of the first lamp unit 30 will be explained.

First, a first modified example of the lamp unit 30 will be explained.

Figure 11:
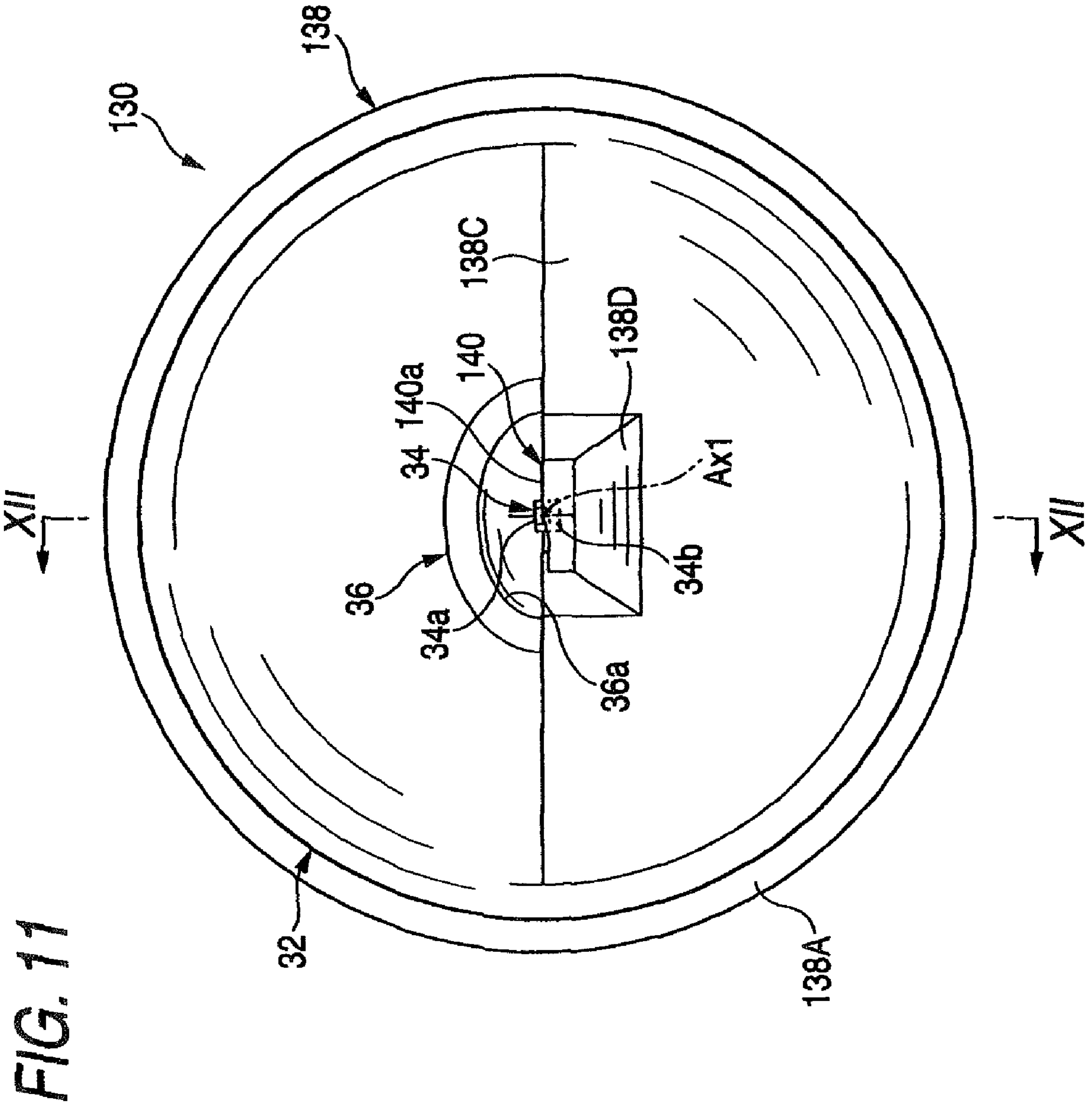
FIG. 11 is a front view showing a first modified example of the first lamp unit.
Figure 12:
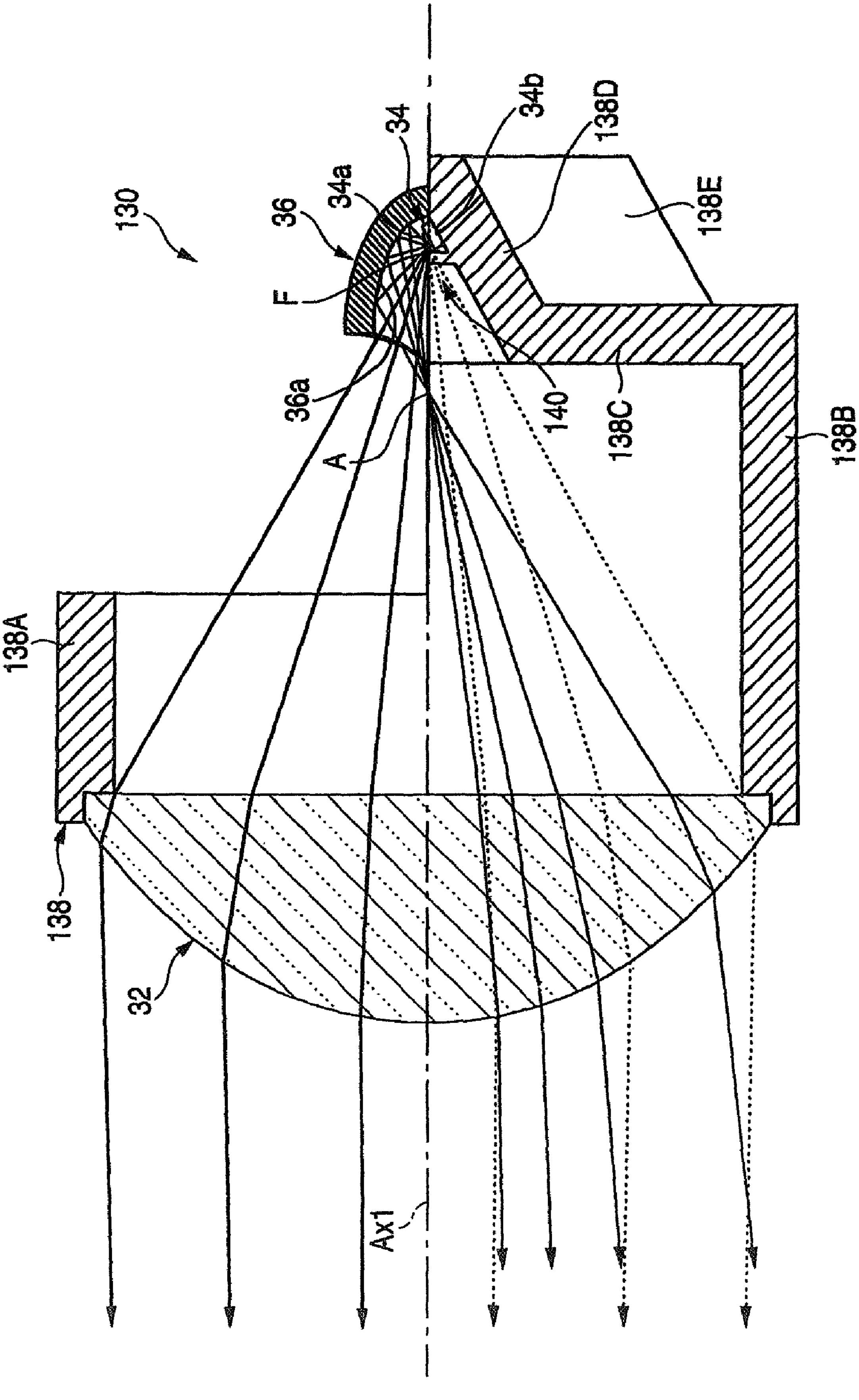
FIG. 12 is a sectional view taken along a line XII-XII of FIG. 11.
Figure 13:
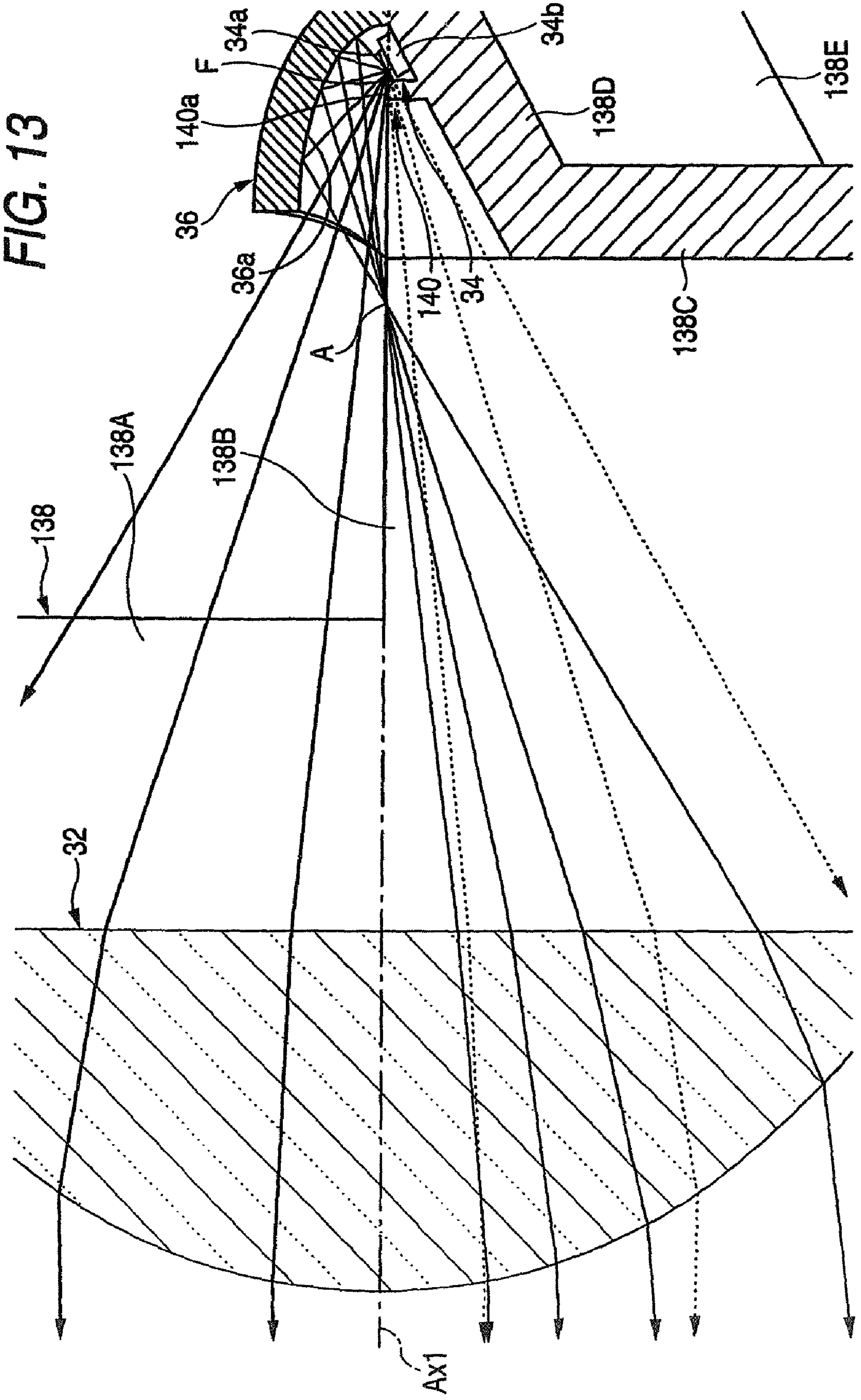
FIG. 13 is a detailed view of an essential portion of FIG. 12.

FIG. 11 is a front view showing a single piece of a lamp unit 130, FIG. 12 is a sectional view taken along a line XII-XII of FIG. 11. Further, FIG. 13 is a detailed view of an essential portion of FIG. 12.

As shown by the drawings, although a basic constitution of the lamp unit 130 is similar to that of the lamp unit 30, a constitution of a holder 138 thereof differ from that of the case of the lamp unit 30.

That is, the holder 138 is constituted as a metal made member similar to the holder 38 of the lamp unit 30 and is constituted by a cylindrical portion 138A, a semicylindrical portion 138B, a vertical portion 138C, an inclined face portion 138D and a plurality of heat radiating fins 138E, however, the cylindrical portion 138A is formed to be slightly longer than the cylindrical portion 38A, further, an upper face of the inclined face portion 138D is formed with a shade 140 integrally with the holder 138.

Thereby, according to the light emitting element 134, the cylindrical portion 138A is displaced to a rear side by an amount of being longer than the cylindrical portion 38A, and the light emitting chip 34*a* is disposed at a rear vicinity of the rear side focal point F of the lens 32. Further, the shade 140 is formed as a vertical wall extended to be orthogonal to the optical axis Ax1 at the position of the rear side focal point F of the lens 32, and shields a portion of directly emitted light directed from the light emitting chip 34*a* to the lens 32.

The shade 140 is formed such that an upper end edge 140*a* thereof passes the optical axis Ax1, at that occasion, the shade 140 is formed such that a rear end edge of the upper end edge 140*a* passes the rear side focal point F. A region of the upper end edge 140*a* on a left side of the optical axis Ax1 (right side in a front view of lamp) is constituted by a horizontal face extended horizontally from the optical axis Ax1 in a left direction, a region thereof on a right side of the optical axis Ax1 is constituted by a short inclined face extended from the optical axis Ax1 in a skewed downward direction (for example, direction downward by 15°) in a right direction, and a horizontal face extended in the right direction further from a right end portion of the inclined face.

Figure 14:
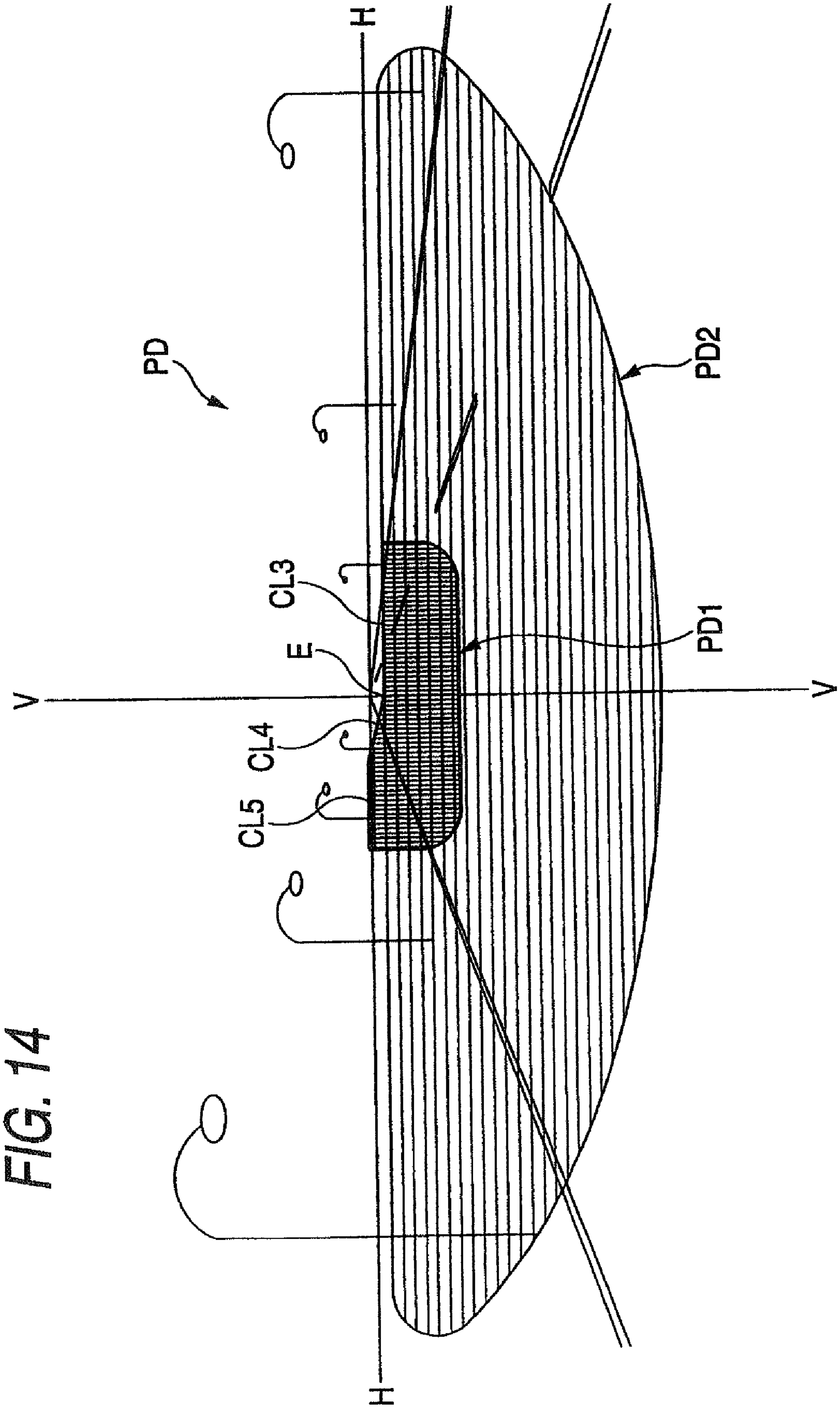
FIG. 14 is a diagram perspectively showing a light distribution pattern formed on the imaginary vertical screen by light irradiated from the lamp unit according to the first modified example to the front side.

FIG. 14 is a diagram perspectively showing a light distribution pattern PD formed on the imaginary vertical screen by light irradiated from the lamp unit 130 according to the modified example to the front side.

As shown by the drawing, the light distribution pattern PD is formed as a light distribution pattern synthesized with a light distribution pattern PD1 and a light distribution pattern PD2.

The light distribution pattern PD1 is a light distribution pattern formed by light incident on the lens 32 from the light emitting chip 34*a* as directly emitted light, and is formed as a small light distribution pattern in a transversely-prolonged rectangular shape as an inverted projected image of the light emitting chip 34*a* by the lens 32.

The light distribution pattern PD1 is formed as a transversely-prolonged light distribution pattern slightly larger than the light distribution pattern PA1 of the light distribution pattern PA and an upper end edge portion thereof is formed with a lower stage horizontal cutoff line CL3, a skewed cutoff line CL4, and an upper stage horizontal cutoff line CL5 by an extremely high brightness ratio.

At that occasion, the light distribution pattern PD1 is slightly larger than the light distribution pattern PA1 because the light emitting chip 34*a* is disposed at a rear vicinity of the rear side focal point F of the lens 32.

Further, the lower stage horizontal cutoff line CL3, the skewed cutoff line CL4, the upper stage horizontal cutoff line CL5 are formed by the extremely high brightness ratio because these are formed as the inverted projected image of the upper end edge 140*a* of the shade 140.

The lower stage horizontal cutoff line CL3 is extended horizontally in the right direction from V-V line at a height position the same as that of the horizontal cutoff line CL1 of the light distribution pattern PA1, the skewed cutoff line CL4 is extended in a left skewed upper direction (for example, by an angle of inclination of 15°) from an intersection of the horizontal cutoff line CL3 and V-V line, the upper stage horizontal cutoff line CL5 is extended horizontally in a left direction to be folded to bend from the skewed cutoff line CL4 at an upper vicinity of H-H line.

On the other hand, the light distribution pattern PD2 is formed by a shape substantially the same as that of the light distribution pattern PA2 of the light distribution pattern PA, and an upper end edge is formed to be substantially flush with the lower stage horizontal cutoff line CL3 and extended in the horizontal direction.

By structuring a constitution of including the shade 140 as in the lamp unit 130 according to the modified example, the light distribution pattern PD1 including a cutoff line in an arbitrary shape having an extremely high brightness ratio at an upper end portion thereof can be formed as an inverted projected image of the upper end edge 140*a* of the shade 140. At that occasion, according to the modified example, the cutoff line of the light distribution pattern PD1 is formed as the lower stage horizontal cutoff line CL3, the skewed cutoff line CL4 and the upper stage horizontal cutoff line CL5 and therefore, the light distribution pattern PD having the light distribution pattern PD1 can be made to be suitable for forming a light distribution pattern for low beam.

Further, although according to the lamp unit 130 of the modified example, by arranging the shade 140, a portion of directly emitted light directed from the light emitting chip 34*a* to the lens 32 is shielded and therefore, an amount of irradiated light is reduced by that amount, since the light emitting chip 34*a* is inclined in an upper direction by about 60° relative to the direction of the front face of the lamp, light shielded by the shade 140 is light directed in the direction inclined by about 60° or more relative to a direction orthogonal to the light emitting face. At that occasion, as shown by FIG. 7(*a*), the luminous intensity I of the light emitting chip 34*a* becomes a considerably small value when the angle from the direction orthogonal to the light emitting face becomes proximate to 90°, and therefore, a light amount sealed by the shade 140 can be made to be small, thereby, a reduction in an amount of irradiated light can be minimized. Further, as shown by FIG. 7(*b*), the luminance L of the light emitting chip 34*a* stays to be constant regardless the angle relative to the light emitting face and therefore, the brightness ratios of the lower stage horizontal cutoff line CL3, the skewed cutoff line CL4 and the upper stage horizontal cutoff line CL5 can be maintained in an extremely high state, Next, a second modified example of the first lamp unit 30 will be explained.

Figure 15:
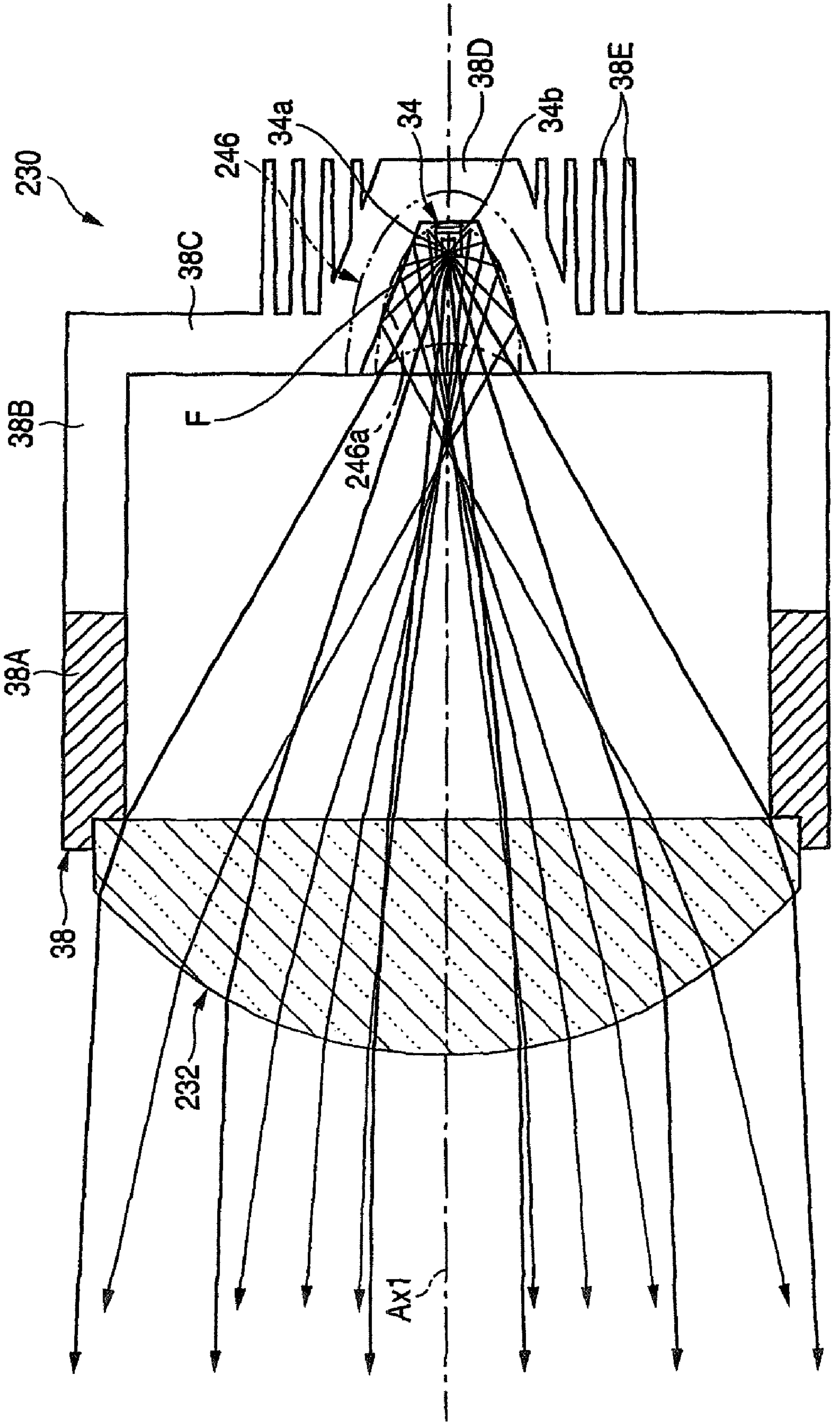
FIG. 15 is a view similar to FIG. 4 showing a second modified example of the first lamp unit.

FIG. 15 is a view similar to FIG. 4 showing a single piece of a lamp unit 230 according to the second modified example.

As shown by the drawing, although a basic constitution of the lamp unit 230 is similar to that of the lamp unit 30, constitutions of a lens 232 and a reflector 246 differ from those of the case of the lamp unit 30.

At that occasion, the constitution of the reflector 246 is quite similar to the constitution of the reflector 46 of the lamp unit 40.

On the other hand, although the lens 232 is quite similar to the lens 32 of the lamp unit 30 in a sectional shape thereof along the vertical face including the optical axis Ax1, a radius of curvature of a sectional shape along the horizontal face including the optical axis Ax1 is set to a value smaller than that of a radius of curvature of the lens 32. Further, thereby, both of light incident on the lens 232 from the light emitting chip 34*a* as directly emitted light and light incident on the lens 232 after having been reflected by the reflecting face 246*a* of the reflector 246 are emitted by a diverging angle larger than that in the case of the lens 32 in the left and right direction.

Figure 16:
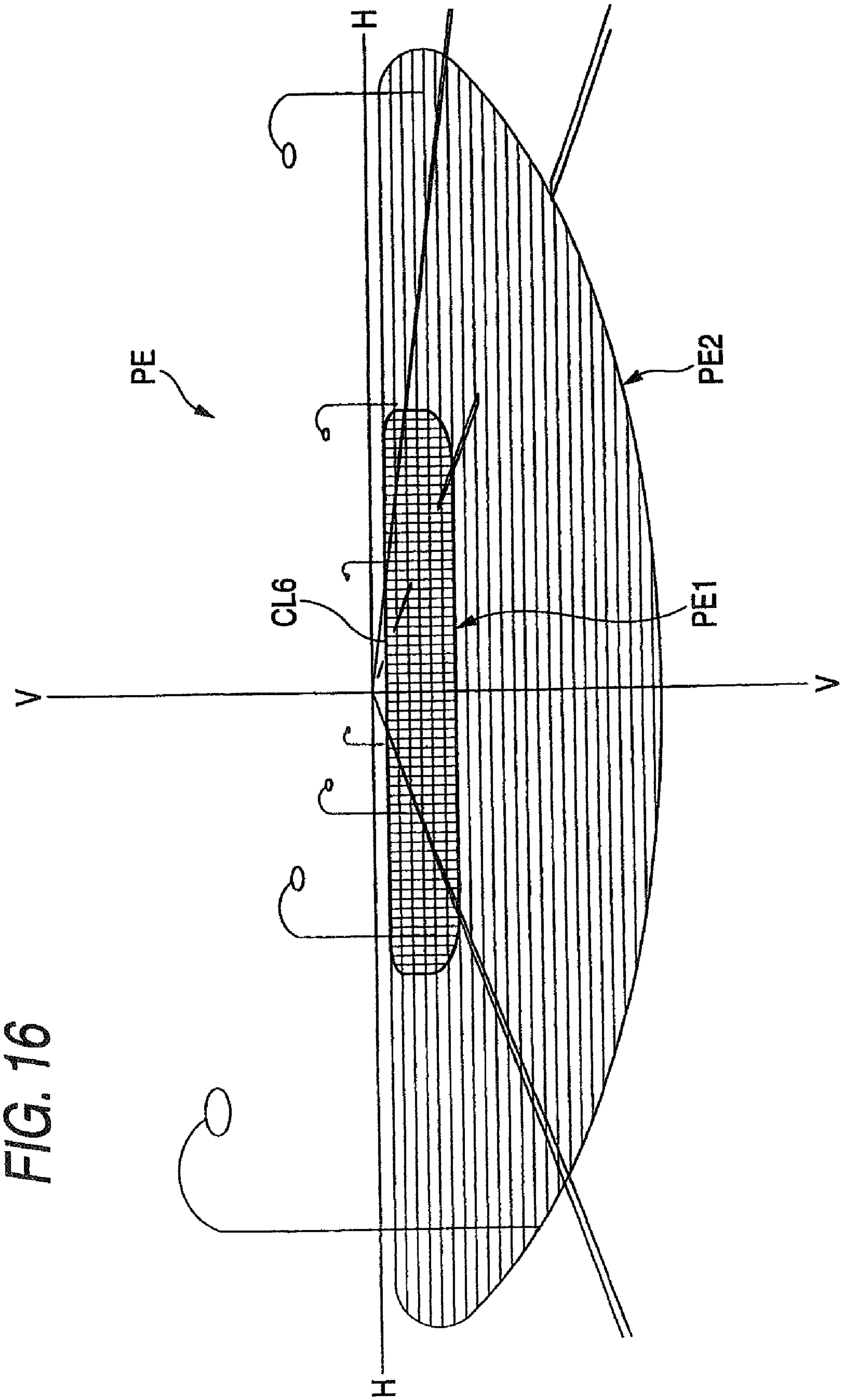
FIG. 16 is a diagram perspectively showing a light distribution pattern formed on the imaginary vertical screen by light irradiated from a lamp unit according to the second modified example to the front side.

FIG. 16 is a diagram perspectively showing a light distribution pattern PE formed on the imaginary vertical screen by light irradiated from the lamp unit 230 according to the second modified example to the front side.

As shown by the drawing, the light distribution pattern PE is formed as a light distribution pattern synthesized with a light distribution pattern PE1 and a light distribution pattern PE2.

The light distribution pattern PE1 is formed as a light distribution pattern formed by light incident on the lens 232 as directly emitted light from the light emitting chip 34*a* and as a comparatively small light distribution pattern in a transversely-prolonged rectangular shape as an inverted projected image of the light emitting chip 34*a* by the lens 232.

The light distribution pattern PE1 is formed as a light distribution pattern having a width in the up and down direction the same as that of the light distribution pattern PA1 of the light distribution pattern PA and transversely-prolonged more than the light distribution pattern PA1, and a horizontal cutoff line CL6 of an upper end edge thereof is formed at a height position the same as that of the horizontal cutoff line CL1 of the light distribution pattern PA1. At that occasion, the light distribution pattern PE1 is formed as the light distribution pattern transversely prolonged more than the light distribution pattern PA1 because the radius of curvature of the sectional shape along the horizontal face including the optical axis Ax1 of the lens 232 is set to the value smaller than the radius of curvature of the lens 32.

On the other hand, the light distribution pattern PA2 is formed as a light distribution pattern having a shape substantially the same as that of the light distribution pattern PA2 of the light distribution pattern PA. This is because whereas an angle of diverging reflected light by the reflector 246 in the left and right direction is smaller than that in the case of the reflector 36, an angle of diverging emitted light by the lens 232 in the left and right direction is larger than that in the case of the lens 32, and operations of the diverging angles are substantially canceled by each other.

By operating the constitution of the lamp unit 230 according to the second modified example, while maintaining a shape of a total of the light distribution pattern PE by the shape substantially the same as that in the case of the light distribution pattern PA, the light distribution pattern PE1 can be formed as the light distribution pattern transversely prolonged more than the light distribution pattern PA1.

Therefore, when the lamp unit 230 is integrated to the vehicle headlamp 10 in place of the lamp unit 30, the hot zone HZL of the light distribution pattern PL for low beam shown in FIG. 9 can further be formed to be prolonged transversely. Further, the lamp unit 230 can be made to be suitable for use as the vehicle lamp for irradiating light to diverge widely in the left and right direction as in, for example, a fog lamp, a cornering lamp or the like.

Next, a third modified example of the first lamp unit 30 will be explained.

Figure 17:
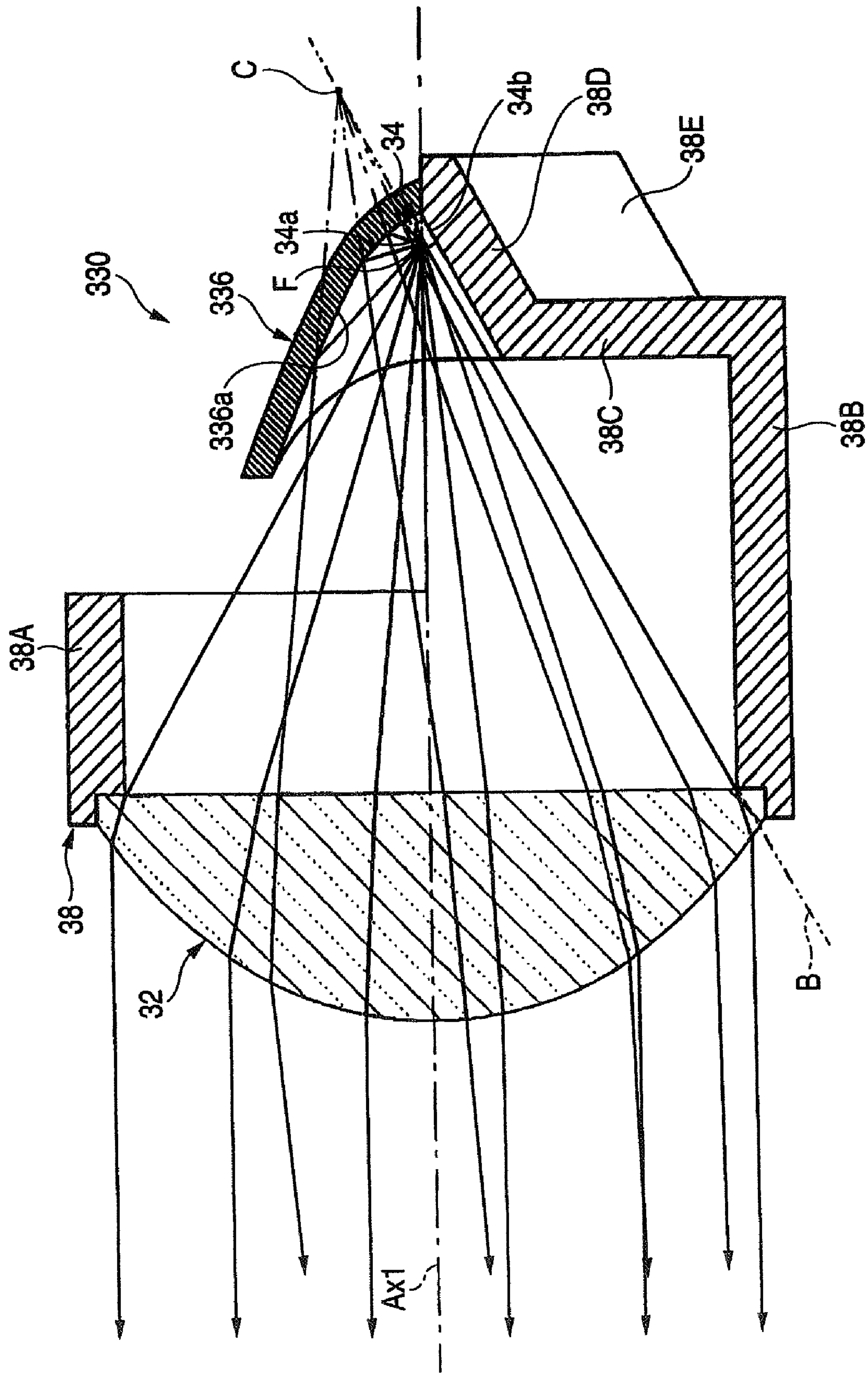
FIG. 17 is a view similar to FIG. 3 showing a single piece of lamp unit according to the third modified example.

FIG. 17 is a view similar to FIG. 3 showing a single piece of lamp unit 330 according to the third modified example.

As shown by the drawing, although a basic constitution of the lamp unit 330 is similar to that of the lamp unit 30, constitutions of a reflector 336 differs that of the case of the lamp unit 30.

That is, similar to the reflector 36, the reflector 336 of the third modified example is formed by a shape of a half dome to cover the light emitting element 34 from an upper side, and a lower end face of a peripheral edge thereof is disposed on a horizontal face including the optical axis Ax1. The reflector 336 reflects light from the light emitting chip 34*a* to the lens 32.

A reflecting face 336*a* of the reflector 336 has a sectional shape in the horizontal face which is substantially the same as the sectional shape in the horizontal face of the reflector 36. However, a sectional shape in the vertical face of the reflecting face 336*a* is set to a hyperbolic shape, which is not the elliptical shape. That is, the sectional shape in the vertical face of the reflecting face 336*a* is configured by one hyperbolic line of a pair of hyperbolic lines having a first focal point at the rear side focal point F of the lens 32 and a second focal point at a point C positioned in a rear side than the focal point F on the linear line B (which is a linear line connecting the rear side focal point F and a lower end of the outer peripheral edge of the effective diameter of the lens 32).

The reflecting face 336*a* reflects light from a point in the light emitting chip 34*a* positioning on the rear side focal point F as a divergence light from the point C in the vertical face. Thereby, the reflected light by the reflecting face 336*a* in the vertical plane is emitted forward of the lamp from the lens 32. In the horizontal plane, the reflected light by the reflecting face 336*a* is substantially converged on the optical axis Ax1.

Therefore, the lamp unit 330 of the third modified example can form substantially the same light distribution pattern as the lamp unit 30.

Although a size of the reflector 336 of the third modified example is larger than a size of the reflector 36, a rear end of the reflector 336 is positioned near a rear side of the light emitting element 34, similar to the reflector 36. Therefore, the lamp unit 330 can also be maintained in a compact constitution, as the lamp unit 30.

Further, according to the exemplary embodiments of the present invention, a reflector with a reflecting face having a vertical section configured by a curved line (such as a parabolic curve) different from that of the reflecting face 336*a* of the reflector 336 or the reflecting face 36*a* of the reflector 36 may be used instead of the reflector 336 or the reflector 36.

It will be apparent to those skilled in the art that various modifications and variations can be made to the described exemplary embodiments and modified examples of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:

a lens arranged on an optical axis extending in a front and rear direction of the lamp;

a light emitting element arranged rearward from the lens, wherein a light emitting chip of the light emitting element is arranged substantially at a rear side focal point of the lens and is provided in a skewed front direction inclined in an upper direction or a lower direction by a predetermined angle relative to a direction of a front face of the vehicle lamp; and a reflector arranged for reflecting light from the light emitting chip to the lens;

wherein one part of the light from the light emitting chip is directly directed to the lens, and another part of the light from the light emitting chip is reflected by the reflector to the lens;

wherein the reflector is configured so that a light distribution pattern formed by said one part of the light which is directly directed to the lens from the light emitting chip is smaller than a light distribution pattern formed by said another part of the light which is reflected by the reflector to the lens, wherein the two light distribution patterns combine to form a cut-off line portion having a higher brightness ratio than a cut-off line portion formed by the light distribution pattern of said another part of the light alone.

2. The vehicle lamp according to claim 1, wherein a sectional shape of the lens along a vertical face including the optical axis is set to a shape of a convex lens having the rear side focal point on the optical axis.

3. The vehicle lamp according to claim 1, wherein the reflector converges the light from the light emitting chip substantially to the optical axis at a front of the rear side focal point in the vertical face including the optical axis.

4. The vehicle lamp according to claim 1, wherein a light emitting face of the light emitting chip substantially coincides with a linear line connecting the rear side focal point of the lens and an outer peripheral edge of an effective diameter of the lens in the vertical face including the optical axis.

5. The vehicle lamp according to claim 1, wherein the light emitting chip directs in the upper direction, and a lower end edge of the light emitting chip is disposed at a vicinity of the rear side focal point.

6. The vehicle lamp according to claim 1, wherein the light emitting chip is skewed in the upper direction, and the light emitting chip is disposed at a rear of the rear side focal point; and a shade for shielding a part of the light from the light emitting chip is arranged at the rear side focal point, and an upper end edge of the shade is disposed substantially at the optical axis.

7. The vehicle lamp according to claim 1, wherein a sectional shape of the lens along a horizontal face including the optical axis is set to a shape different from a sectional shape along the vertical face including the optical axis.

8. The vehicle lamp according to claim 1, wherein the predetermined angle is 40 through 80°.

* * * * *